United States Patent
Haupt et al.

(10) Patent No.: US 12,365,217 B2
(45) Date of Patent: Jul. 22, 2025

(54) HVAC DUAL INLET DESIGN FOR PARTIAL RECIRCULATION OPERATION

(71) Applicant: Hanon Systems, Daejeon (KR)

(72) Inventors: Eric K. Haupt, Livonia, MI (US); Mark Douglas Conley, Canton, MI (US); Martin Coleman, Milan, MI (US); Dennis Vermette, Westland, MI (US); Shane Harte, Novi, MI (US)

(73) Assignee: HANON SYSTEMS, Daejeon (KR)

( * ) Notice: Subject to any disclaimer, the term of this patent is extended or adjusted under 35 U.S.C. 154(b) by 405 days.

(21) Appl. No.: 17/805,816

(22) Filed: Jun. 7, 2022

(65) Prior Publication Data

US 2023/0286352 A1    Sep. 14, 2023

Related U.S. Application Data

(60) Provisional application No. 63/269,020, filed on Mar. 8, 2022.

(51) Int. Cl.
*B60H 1/00* (2006.01)

(52) U.S. Cl.
CPC ..... *B60H 1/00671* (2013.01); *B60H 1/00564* (2013.01)

(58) Field of Classification Search
CPC ............ B60H 1/00671; B60H 1/00564; B60H 1/00835; B60H 1/00764; B60H 1/26
See application file for complete search history.

(56) References Cited

U.S. PATENT DOCUMENTS

2020/0346519 A1* 11/2020 Haupt ................ B60H 1/00685

FOREIGN PATENT DOCUMENTS

| CN | 109378550 A | * | 2/2019 | ......... B60H 1/00278 |
| JP | H09226348 A | | 9/1997 | |
| JP | 2004136772 A | | 5/2004 | |
| JP | 2019044739 A | | 3/2019 | |
| KR | 100693549 B1 | | 3/2007 | |

OTHER PUBLICATIONS

CN_109378550_A translation.*

* cited by examiner

*Primary Examiner* — Elizabeth J Martin
(74) *Attorney, Agent, or Firm* — Shumaker, Loop & Kendrick, LLP; James D. Miller

(57) ABSTRACT

An air handling system a housing defining an inlet section which includes a first inlet portion and a second inlet portion. The first inlet portion includes a first recirculation inlet receiving recirculated air from a passenger compartment of the vehicle and a first ambient air inlet receiving ambient air from the environment. The second inlet portion includes a second recirculation inlet receiving recirculated air from the passenger compartment of the vehicle and a second ambient air inlet receiving the ambient air from the environment. A first air distribution door and a first baffle door are disposed in the inlet section to selectively control distribution of the recirculated air and the ambient air entering the first inlet portion. A second air distribution door and a second baffle door are disposed in the inlet section to selectively control distribution of the recirculated air and the ambient air entering the second inlet portion.

17 Claims, 26 Drawing Sheets

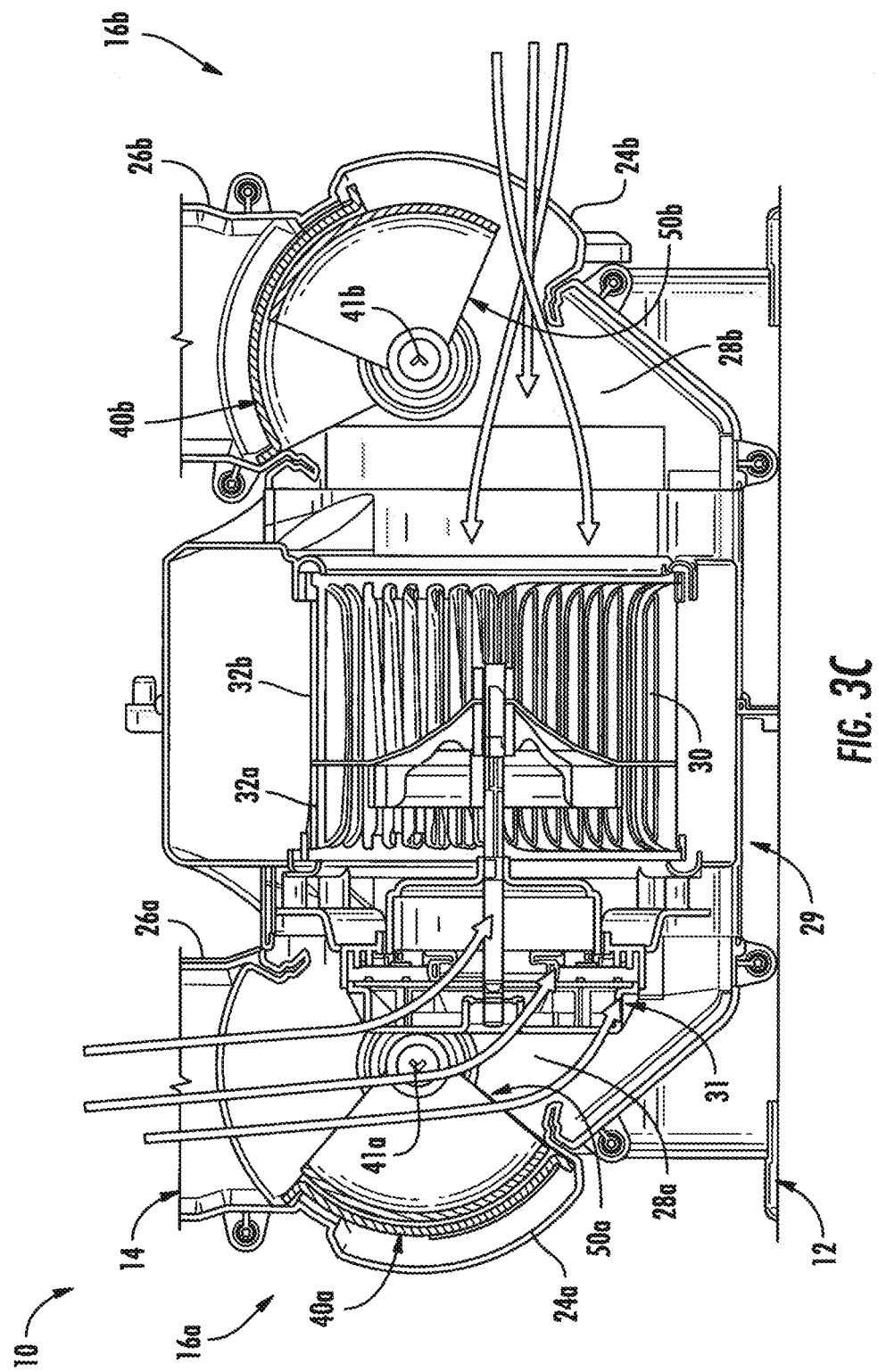

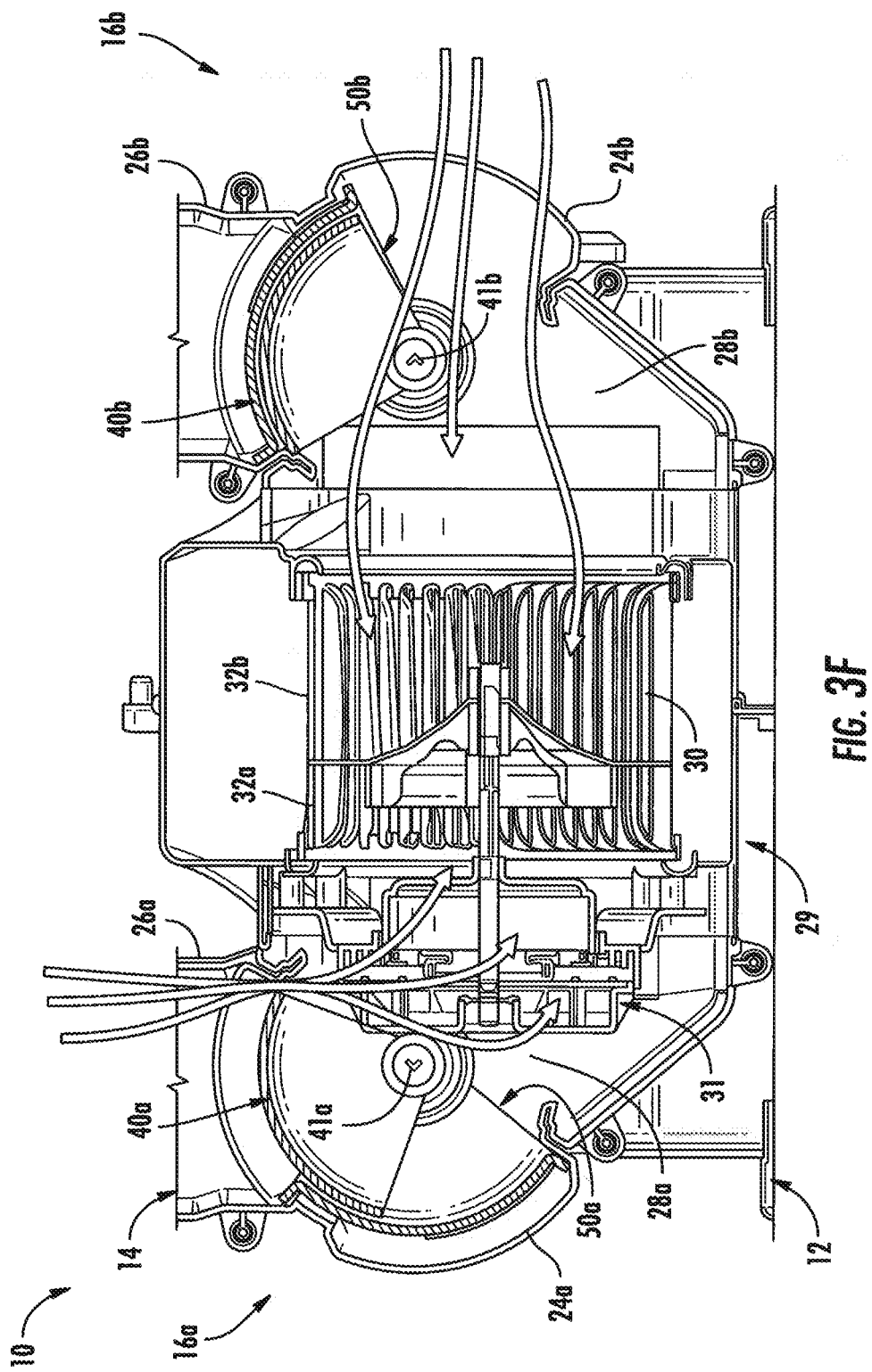

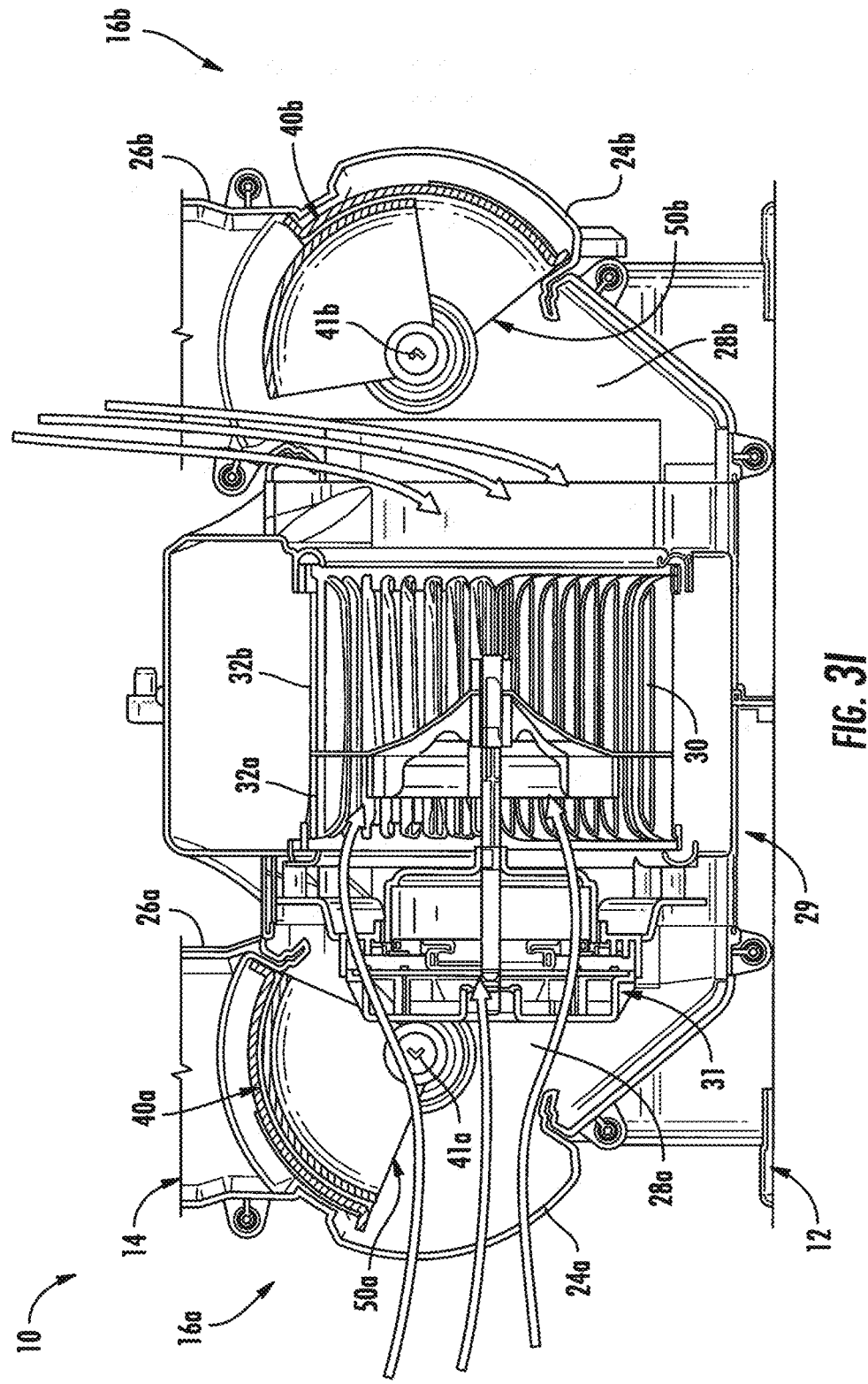

HVAC DUAL INLET DESIGN FOR PARTIAL RECIRCULATION OPERATION

CROSS-REFERENCE TO RELATED APPLICATION

This application claims the benefit of U.S. Provisional Patent Application Ser. No. 63/269,020, filed Mar. 8, 2022, the entirety of which is herein incorporated by reference.

FIELD

The invention relates to a heating, ventilation, and air-conditioning (HVAC) system, and more particularly to an air handling system having a dual inlet design for an HVAC system.

BACKGROUND

Introduction of electric and hybrid electric vehicles has resulted in the need for energy conservation with respect to various different systems of the associated vehicles. With regards to an HVAC system of such vehicles, it may be necessary to recirculate previously-conditioned air present within the passenger compartment in order to improve an efficiency of the HVAC system. This occurs because the previously-conditioned air is typically already in a heated or cooled state in comparison to an ambient environment. Hence, the HVAC system requires a decreased heating or cooling input when conditioning the recirculated air originating from the passenger compartment. However, the exclusive use of recirculated air originating from the passenger compartment can introduce undesirable fogging on an interior surface of windows of the vehicle during various operational modes of the HVAC system. Such fogging of the vehicle windows occurs because each breath taken in by passengers of the vehicle adds moisture to the air being recirculated, and thereby increase a humidity level within the passenger compartment.

In order to prevent such occurrences, it may be desirable to introduce ambient air to the HVAC system in addition to or in place of the recirculated air. The use of a combination of a partial flow of ambient air and a partial flow of recirculated air accordingly reduces the risk of fogging of the vehicle windows, which in turn improves vehicle safety.

Commonly known HVAC systems include an air handling system having a housing that defines a flow path for the ambient air to flow through when being conditioned and then distributed to the passenger compartment through various vents. The air handling system typically may include an air inlet section where air first enters before being distributed to a conditioning section thereof. The air inlet section may include at least an ambient air inlet and a recirculated air inlet that can each be used to introduce the air into the conditioning section. An air distribution door controls the distribution of the air entering from the ambient air inlet and the recirculated air inlet. For example, the air distribution door may be adjustable between a first position wherein the ambient air inlet is completely open while the recirculated air inlet is completely closed, a second position wherein the ambient air inlet is completely closed while the recirculated air inlet is completely open, and a plurality of intermediate positions wherein the air distribution door adjustably controls a distribution of the air originating from the ambient air inlet and the recirculated air inlet. The ambient air inlet and the recirculated air inlet typically each lead to an air filter and a downstream blower assembly. A suction pressure generated by the blower assembly causes the air within the air inlet section to flow in a direction through the air filter and towards a blower wheel of the blower assembly. The air then exits the blower assembly and flows towards the conditioning section of the air handling system where the air is conditioned and distributed to the various vents of the vehicle based on a passenger selected mode of operation of the HVAC system.

Conventional air handling systems may employ a single air distribution door within the air inlet section. Use of only one air distribution door can disadvantageously cause an unintended and undesirable condition when attempting to introduce a combination of ambient and recirculated air into the conditioning section of the air handling system through the air inlet section. The air distribution door allows for an open flow path to be provided between the ambient air inlet and the recirculated air inlet when the air distribution door is in one of the intermediate positions. Under some circumstances, however, the use of the single air distribution door can lead to a situation where a velocity of the vehicle causes an increase of ram air pressure, which thereby causes an increase in an amount of the ambient air introduced to the air inlet section. As the ram air pressure increases, a likelihood of the ambient air reaching a pressure sufficient for causing an undesirable amount of the ambient air to flow past the air distribution door and towards the conditioning section similarly increases.

The introduction of the undesired amount of the ambient air into the conditioning section of the air handling system decreases the efficiency of the HVAC system by introducing unconditioned air into the conditioning section that must in turn be conditioned, which in turn increases a thermal load placed on the HVAC system when attempting to achieve the desired conditioning of the air being delivered to the passenger compartment. This increase in thermal load increases an amount of energy that is consumed by the HVAC system to condition the air to in accordance with the requirements of the passenger of the vehicle. Such flow of the undesired amount of the ambient air into the air inlet section also decreases the ability of the HVAC system to regulate the temperature and humidity level of the air within the passenger compartment, thereby negatively affecting the comfort of the passenger.

Accordingly, it would be desirable to produce an improved air handling system capable of regulating the air flow between the ambient air inlet and the recirculated air inlet to optimize performance, effectiveness, and efficiency of the HVAC system.

SUMMARY

In concordance and agreement with the present invention, an improved an air handling system capable of regulating the air flow between the ambient air inlet and the recirculated air inlet to optimize performance, effectiveness, and efficiency of the HVAC system, has surprisingly been discovered.

In one embodiment, an air handling system of a vehicle, comprises: a housing defining an inlet section, the inlet section including a first inlet portion and a second inlet portion, wherein the first inlet portion includes a first recirculation inlet configured to receive recirculated air originating from a passenger compartment of the vehicle and a first ambient air inlet configured to receive ambient air originating from an ambient environment, and wherein the second inlet portion includes a second recirculation inlet configured to receive recirculated air originating from the passenger compartment of the vehicle and a second ambient air inlet configured to receive the ambient air originating from the ambient environment; a first air distribution door disposed in the inlet section and configured to selectively control a distribution of the recirculated air and the ambient air entering the first inlet portion through the first recirculation inlet and the first ambient air inlet; a second air distribution door disposed in the inlet section and configured to selectively control a distribution of the recirculated air and the ambient air entering the second inlet portion through the second recirculation inlet and the second ambient air inlet; a first baffle door disposed in the inlet section and configured to selectively control a flow of the recirculated air and the ambient air entering the first inlet portion through the first recirculation inlet and the first ambient air inlet; and a second baffle door disposed in the inlet section and configured to selectively control a flow of the recirculated air and the ambient air entering the second inlet portion through the second recirculation inlet and second ambient air inlet.

In some embodiments, the housing further defines a first blower flow path disposed downstream of the first air distribution door and the first baffle door with respect to the flow of the recirculated air and the flow of the ambient air, wherein the first blower flow path leads to a blower assembly of the air handling system.

In some embodiments, the housing further defines a second blower flow path disposed downstream of the second air distribution door and the second baffle door with respect to the flow of the recirculated air and the flow of the ambient air, wherein the second blower flow path leads to the blower assembly of the air handling system.

In some embodiments, the housing includes one or more openings formed therein to fluidly connect the first blower flow path and the second blower flow path to permit the flow of air from the first inlet portion to mix with the air from the second inlet portion prior to flowing into the blower assembly.

In some embodiments, the first baffle door is configured for sealing against one of a surface of the first air distribution door and a surface of the housing.

In some embodiments, the first air distribution door includes an air directing wall and the first baffle door includes a baffle wall, wherein the baffle wall is disposed radially inwardly of the air directing wall relative to the common axis of rotation.

In some embodiments, the first baffle door includes at least one sealing element disposed along a peripheral portion of the baffle wall for sealing against at least one of a surface of the first air distribution door and a surface of the housing.

In some embodiments, the first baffle door includes at least one sealing element disposed between a radially inner surface of the air directing wall of the first air distribution door and a radially outer surface of the baffle wall of the first baffle door.

In some embodiments, the first air distribution door includes at least one sealing element for sealing against a surface of the housing while the first baffle door is devoid of a sealing element for sealing against a surface of the housing.

In some embodiments, the second baffle door is configured for sealing against one of a surface of the second air distribution door and a surface of the housing.

In some embodiments, the second air distribution door includes an air directing wall and the second baffle door includes a baffle wall, wherein the baffle wall is disposed radially inwardly of the air directing wall relative to the common axis of rotation.

In some embodiments, the second baffle door includes at least one sealing element disposed along a peripheral portion of the baffle wall for sealing against at least one of a surface of the second air distribution door and a surface of the housing.

In some embodiments, the second baffle door includes at least one sealing element disposed between a radially inner surface of the air directing wall of the second air distribution door and a radially outer surface of the baffle wall of the second baffle door.

In some embodiments, the second air distribution door includes at least one sealing element for sealing against a surface of the housing while the second baffle door is devoid of a sealing element for sealing against a surface of the housing.

In some embodiments, the air handling system is configured for operation in a recirculation mode of operation, wherein the recirculation mode of operation includes the first air distribution door and the first baffle door in a first position to militate against a flow of the ambient air through the first ambient air inlet, and the second air distribution door and the second baffle door in a first position to militate against a flow of the ambient air through the second ambient air inlet.

In some embodiments, the air handling system is configured for operation in an ambient air mode of operation, wherein the ambient air mode of operation includes the first air distribution door and the first baffle door in a second position to militate against a flow of the recirculation air through the first recirculation inlet, and the second air distribution door and the second baffle door in a second position to militate against a flow of the recirculation air through the second recirculation inlet.

In some embodiments, at least one of the first baffle door and the second baffle door is configured to decrease the flow of the ambient air through the ambient air inlet to accommodate for an increase of a ram air pressure resulting from an increase in a speed of the vehicle.

In some embodiments, the air handling system is configured for operation in a partial recirculation mode of operation, wherein the partial recirculation mode of operation includes at least one of the first air distribution door, the second distribution door, the first baffle door, and the second baffle door selectively positioned in an intermediate position to selectively control the flow of the recirculated air and/or the ambient air through the inlet section to reach a desired distribution of the recirculated air and the ambient air and accommodate the ram air pressure increasing in response to an increasing speed of the vehicle.

In another embodiment, a method of operating an air handling system of a vehicle comprises the steps of: providing a housing, a first air distribution door, a second air distribution door, a first baffle door, and a second baffle door, the housing defining an inlet section, wherein the inlet section includes a first inlet portion and a second inlet portion, wherein the first inlet portion includes a first recirculation inlet configured to receive recirculated air originating from a passenger compartment of the vehicle and a first ambient air inlet configured to receive ambient air originating from an ambient environment, wherein the second inlet portion includes a second recirculation inlet configured to receive recirculated air originating from the passenger compartment of the vehicle and a second ambient air inlet configured to receive the ambient air originating from the ambient environment, wherein the first air distribution door is disposed in the inlet section and configured to selectively control a distribution of the recirculated air and the ambient air entering the first inlet portion through the first recirculation inlet and the first ambient air inlet, wherein the second air distribution door is disposed in the inlet section and configured to selectively control a distribution of the recirculated air and the ambient air entering the second inlet portion through the second recirculation inlet and the second ambient air inlet, wherein the first baffle door is disposed in the inlet section and configured to selectively control a flow of the recirculated air and the ambient air entering the first inlet portion through the first recirculation inlet and the first ambient air inlet, and wherein the second baffle door is disposed in the inlet section and configured to selectively control a flow of the recirculated air and the ambient air entering the second inlet portion through the second recirculation inlet and second ambient air inlet; and selectively positioning of at least one of the first air distribution door, the second air distribution door, the first baffle door, and the second baffle door to selectively control a flow of the recirculated air and the ambient air through the inlet section.

In some embodiments, the flow of the ambient air through the inlet section is decreased in response to an increase in a speed of the vehicle.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein:

FIG. 3C is a fragmentary cross-sectional elevational view through the inlet section of the air handling system of FIG. 1, wherein the air handling system is operating in a partial recirculation mode of operation with the first air distribution door and the first baffle door in the second positions to permit the flow of the ambient air through the first ambient inlet and militate against the flow of the recirculation air through the first recirculation inlet of the inlet section and the second air distribution door in the first position to militate against the flow of the ambient air through the second ambient inlet and the second baffle door in another intermediate position to permit a more constricted flow of the recirculation air through the second recirculation inlet of the inlet section than shown in FIG. 3B;

FIG. 3F is a fragmentary cross-sectional elevational view through the inlet section of the air handling system of FIG. 1, wherein the air handling system is operating in a partial recirculation mode of operation with the first air distribution door in the second position to militate against the flow of the recirculation air through the first recirculation inlet and the first baffle door in yet another intermediate position to permit a more constricted flow of the ambient air through the first ambient inlet of the inlet section than shown in FIGS. 3D and 3E, and the second air distribution door and the second baffle door in the first positions to militate against the flow of the ambient air through the second ambient inlet and permit the flow of the recirculation air through the second recirculation inlet of the inlet section;

FIG. 3I is a fragmentary cross-sectional elevational view through the inlet section of the air handling system of FIG. 1, wherein the air handling system is operating in a partial recirculation mode of operation with the first air distribution door and the first baffle door in the first positions to militate against the flow of the ambient air through the first ambient inlet and permit the flow of the recirculation air through the first recirculation inlet of the inlet section and the second air distribution door in the second position to militate against the flow of the recirculation air through the second recirculation inlet of the inlet section and the second baffle door in another intermediate position to permit a more constricted flow of the ambient air through the second ambient inlet of the inlet section than shown in FIG. 3H;

DETAILED DESCRIPTION

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

Figure 1:
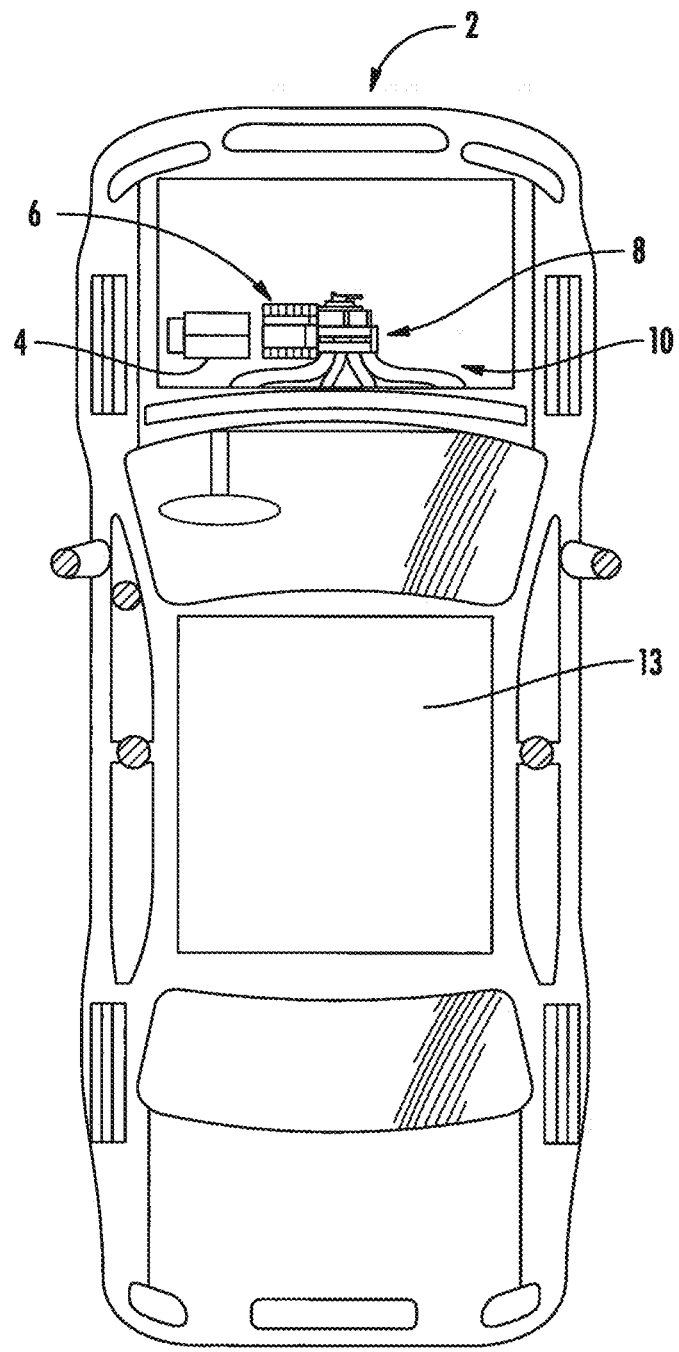
FIG. 1 is a schematic top plan view of an electric vehicle including an HVAC system having an air handling system.
Figure 2:
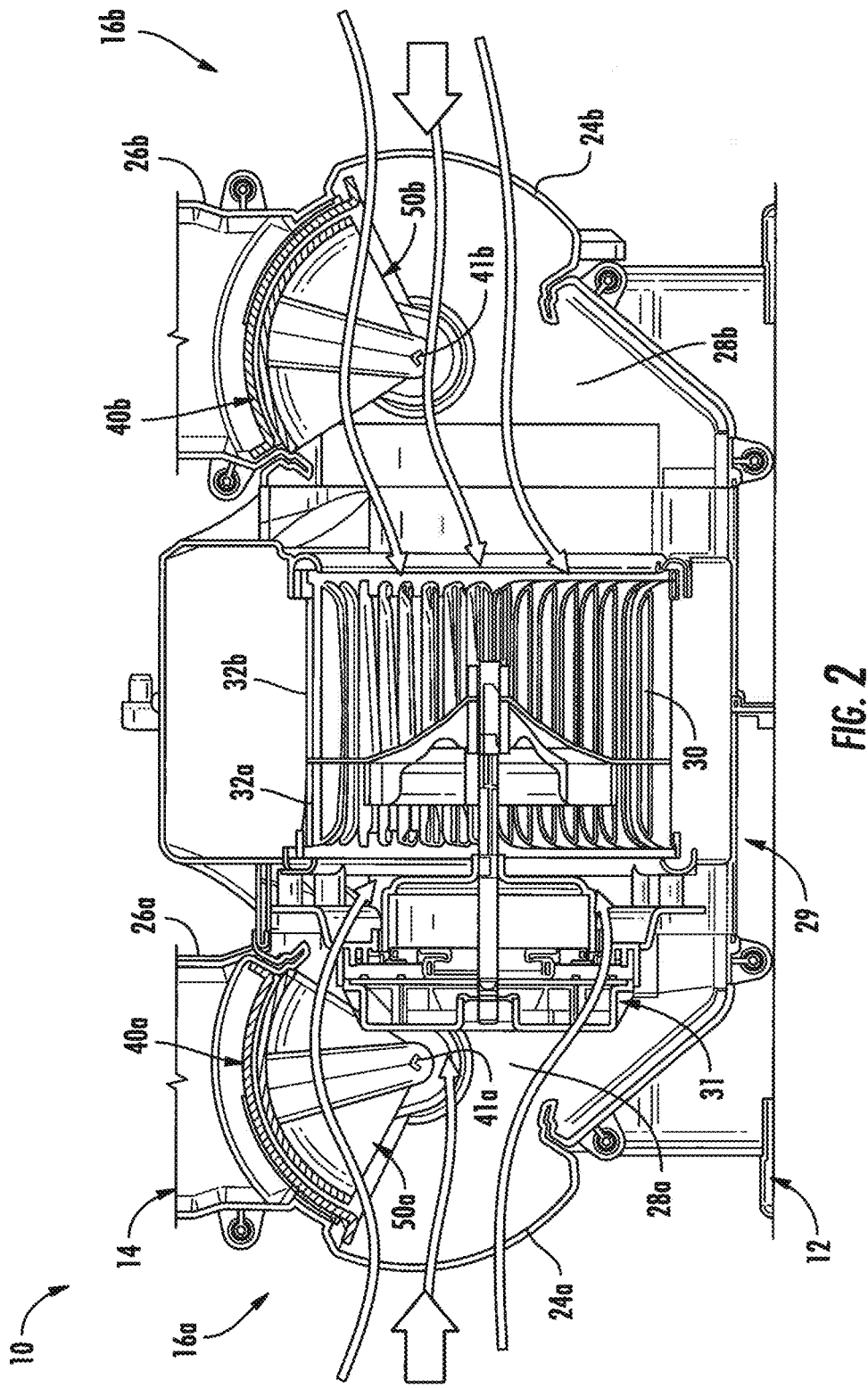
FIG. 2 is a fragmentary cross-sectional elevational view through an inlet section of the air handling system of FIG. 1 according to an embodiment of the presently disclosed subject matter, wherein the air handling system is operating in a recirculation mode of operation with a first air distribution door and a first baffle door in first positions to militate against a flow of a fresh or ambient air through a first fresh or ambient inlet and permit a flow of a recirculation air through a first recirculation inlet of the inlet section and a second air distribution door and a second baffle door in first positions to militate against a flow of a fresh or ambient air through a second fresh or ambient inlet and permit a flow of a recirculation air through a second recirculation inlet of the inlet section.

FIG. 1 is a schematic top plan view of a vehicle 2 including a power source 4, a controller 6, and a heating, ventilation, and air-conditioning (HVAC) system 8 having an air handling system 10 in accordance with the present disclosure.

FIGS. 2-6B illustrate the air handling system 10 according to the presently described subject matter. The air handling system 10 forms a portion of the HVAC system 8 of the vehicle 2, which may be an electric or hybrid electric vehicle. However, the air handling system 10 disclosed herein may be utilized in any type of vehicle including a vehicle utilizing an internal combustion engine without departing the scope of the present disclosure. It should be appreciated that the air handling system 10 may be utilized in any type of system application that requires regulating multiple airflow paths.

The air handling system 10 may include a housing 12 defining a flow path for air to pass through when being conditioned for distribution to a passenger compartment 13 of the associated vehicle 2. The housing 12 may include an inlet section 14 wherein air is first introduced into the housing 12. The housing 12 further defines a conditioning section (not shown) disposed downstream of the inlet section 10 for heating or cooling the air, a mixing section (not shown) disposed downstream of the conditioning section for mixing the heated or cooled air, and a distribution section (not shown) disposed downstream of the mixing section where the air is distributed to flow paths leading to vents directed toward the passenger compartment 13 of the vehicle.

As illustrated in FIGS. 2-6A, the inlet section 14 may be comprise a first inlet portion 16a and a second inlet portion 16b. The first inlet portion 16a may include a first recirculation inlet 24a and a first ambient or fresh air inlet 26a. Similarly, the second inlet portion 16b may include a second recirculation inlet 24b and a second ambient or fresh air inlet 26b. The recirculation inlets 24a, 24b may be in fluid communication with the passenger compartment 13 of the vehicle 2 and configured to provide a flow path for previously conditioned air to return to the housing 12 for additional heating or cooling within the conditioning section of the housing 12. A suitable conduit or the like (not shown) may be utilized to fluidly couple the passenger compartment 13 to the recirculation inlets 24a, 24b as desired. The ambient air inlets 26a, 26b may in fluid communication with the ambient environment surrounding the vehicle 2 and is configured to provide a flow path for ambient air to be first introduced into the housing 12 for heating or cooling within the conditioning section of the housing 12. An air cowl or other similar conduit (not shown) may be utilized to fluidly couple the ambient environment to the ambient air inlets 26a, 26b, as desired.

The housing 12 may further include a first blower flow path 28a and a second blower flow path 28b disposed within a respective one of the inlet portions 16a, 16b downstream of the recirculation inlets 24a, 24b and the ambient air inlets 26a, 26b. The blower flow paths 28a, 28b lead to a blower assembly 29 disposed within the housing 12 between the first inlet portion 16a and the second inlet portion 16b. The blower assembly 29 may be configured to generate a pressure difference (i.e. a suction pressure) for drawing the recirculated air and the ambient air into the inlet section 10.

The blower assembly 29 may include a rotary blower wheel 30 for generating the pressure difference, as desired. The associated blower wheel 30 may be drivingly coupled to an electric motor 31 and configured to operate at a plurality of different rotational speeds as established by a selection of a passenger of the vehicle 2 and/or the controller 6 in communication with the HVAC system 8, wherein each of the different rotational speeds is associated with a different flow rate of the air through the remainder of the air handling system 10 at positions downstream of the blower assembly 29. Various types of blower wheels 30 may be employed. The blower wheel 30 may be divided into a first portion 32*a* and a second portion 32*b*. The portions 32*a*, 32*b* of the blower wheel 30 may be integrally formed as a unitary structure or as separate and distinct components. In certain embodiments, the first portion 32*a* and the second portion 32*b* of the blower wheel 30 may be substantially similar or the same size. In other embodiments, however, the first portion 32*a* may be relatively smaller than the second portion 32*a*. For example, the first portion 32*a* may comprise less than 50% of the entire blower wheel 30, preferably about 25% thereof, and the second portion 32*b* may comprise more than 50% of the entire blower wheel 30, preferably about 75% thereof. In some embodiments, the first portion 32*a* of the blower wheel 30 may be associated with the ambient air and the second portion 32*b* may be associated with the recirculated air, or vice versa.

In the embodiment shown in FIGS. 2-5, the air flowing through the first blower flow path 28*a* is separated from the air flowing through the second blower flow path 28*b* prior to being drawn into the blower assembly 29. At a relatively low recirculation requirement of the embodiments of the air handling system 10 employing the blower wheel 30 having differently sized portions 32*a*, 32*b*, the smaller first portion 32*a* associated with ambient air must work harder to achieve a desired flow rate of the air being delivered to the passenger compartment 13, which requires an increase in a rotational speed of the blower wheel 30. In other embodiments, however, such as that depicted in FIGS. 6A and 6B, the blower flow paths 28*a*, 28*b* may in fluid communication with each other through one or more openings 34 formed in the housing 12. The one or more openings 34 may permit a crossflow of the air flowing through the first blower flow path 28*a* and the air flowing through the second blower flow path 28*b*, which thereby allows the air to mix prior to being drawn into the blower assembly 29. A valve (not shown) such as a one-way valve may be disposed in each of the one or more openings 34 to selectively control an amount and a direction of the crossflow. By permitting the crossflow, the flow of air into the differently-sized portions 32*a*, 32*b* of the blower wheel 30 may be more balanced so that the desired flow rate of the air being delivered to the passenger compartment 13 may be reached at a lower blower speed, which reduces energy consumption of the HVAC system 8.

One or more air filters (not shown) may also be disposed within the inlet section 14 of the housing 12 of the air handling system 10 to remove any debris from the air that could otherwise flow through the housing 12 before eventually reaching the passenger compartment 13 of the vehicle 2. In some embodiments, the one or more air filters may be disposed in each of the blower flow paths 28*a*, 28*b* and/or downstream of the blower assembly 29, extending across an entirety of a flow cross-section thereof. The one or more air filters may be configured to allow for the passage of the air therethrough, but yet rigid and solid in a manner wherein the air filter may function as a stopping mechanism or resting surface, as explained in greater detail hereinafter. It should be understood that the passage of air through the air filter may lower the pressure of the air as a result of the flow obstruction provided by the air filter in a manner resisting the back-flow of the air in a direction upstream of the air filter after the air has passed therethrough.

As illustrated, the first inlet portion 16*a* may further include a first air distribution door 40*a* and a first baffle door 50*a* for controlling the flow of the air through each of the first recirculation inlet 24*a* and the first ambient air inlet 26*a*. Similarly, the second inlet portion 16*b* may further include a second air distribution door 40*b* and a second baffle door 50*b* for controlling the flow of the air through each of the second recirculation inlet 24*b* and the second ambient air inlet 26*b*. The air distribution doors 40*a*, 40*b* and the baffle doors 50*a*, 50*b* are shown independently of the remainder of the housing 12 in FIGS. 7A, 7B, 8, and 9A-9C to better illustrate the individual features of one embodiment thereof in comparison to FIGS. 2-6A, which illustrate the doors 40*a*, 40*b*, 50*a*, 50*b* in substantially simplified fashion to more easily illustrate the modes of operation associated with the illustrated air handling system 10.

Figure 6A:
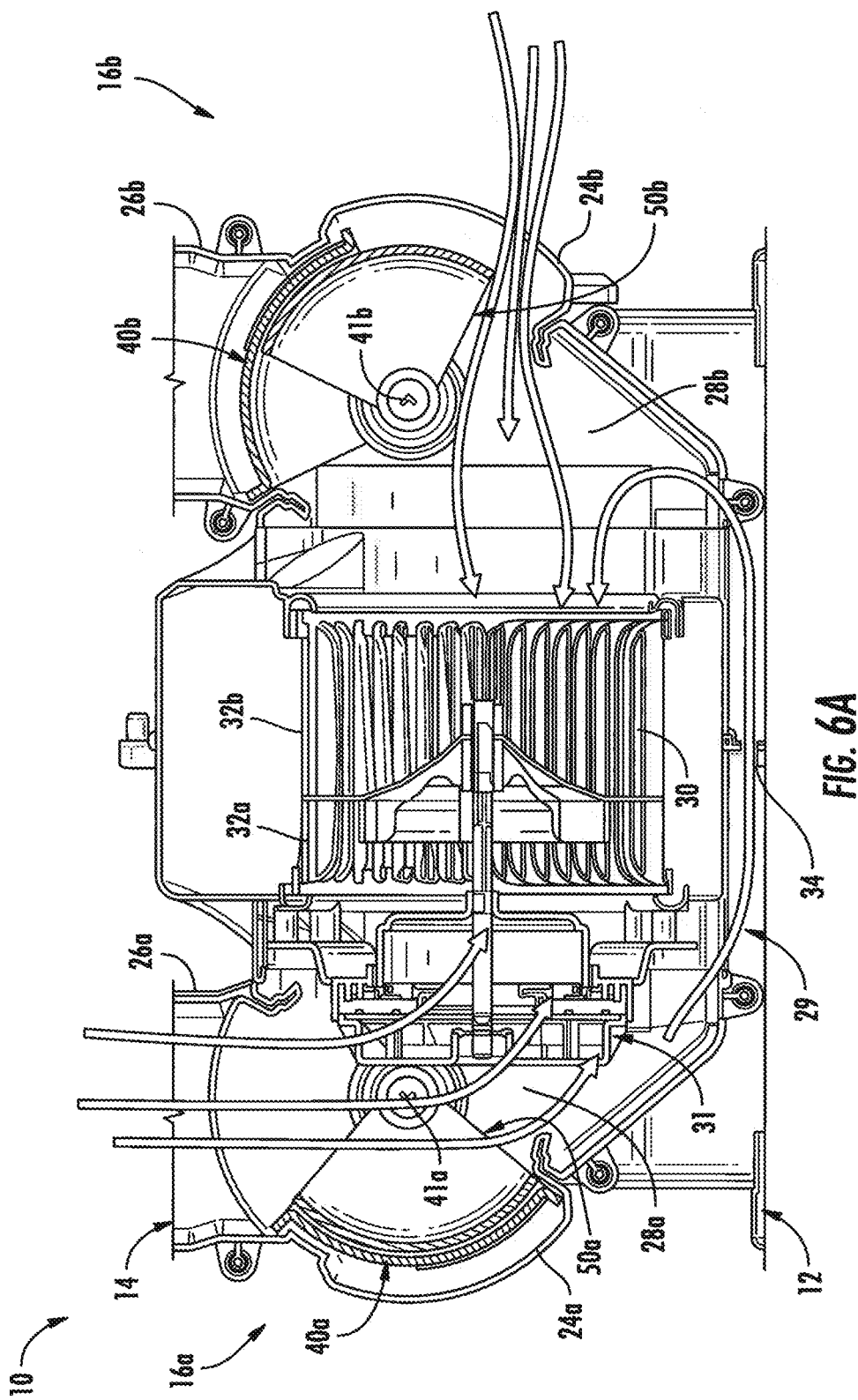
FIG. 6A is a fragmentary cross-sectional elevational view through the inlet section of the air handling system of FIG. 1 according to another embodiment of the presently disclosed subject matter, wherein a housing of the air handling system is configured to allow a crossflow of air between first and second inlet portions of the inlet section, and wherein the air handling system is operating in a partial recirculation mode of operation with the first air distribution door and the first baffle door in the second positions to permit the flow of the ambient air through the first ambient inlet and militate against the flow of the recirculation air through the first recirculation inlet of the inlet section and the second air distribution door in the first position to militate against the flow of the ambient air through the second ambient inlet and the second baffle door in an intermediate position to permit a constricted flow of the recirculation air through the second recirculation inlet of the inlet section.
Figure 6B:
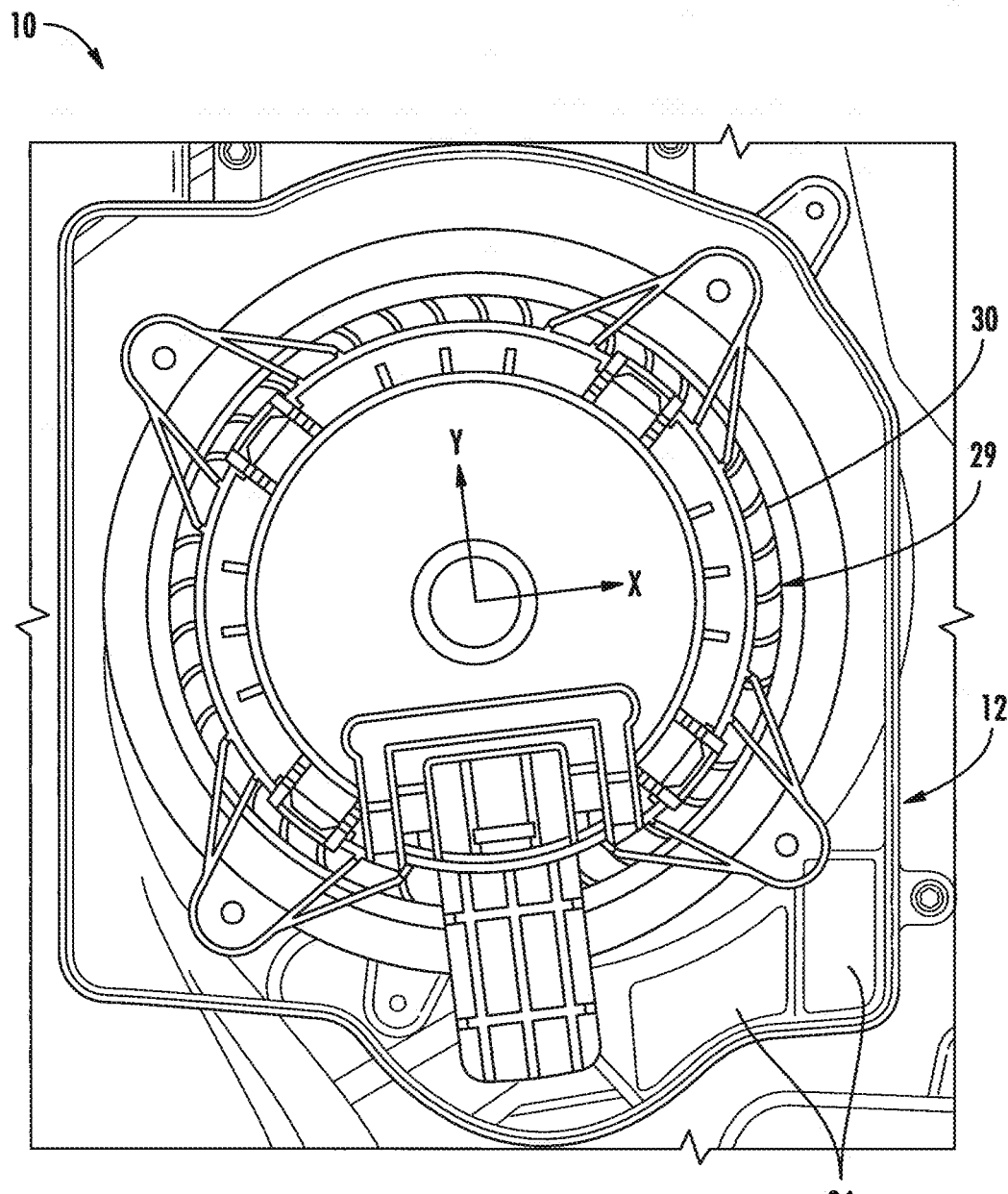
FIG. 6B is a fragmentary transverse cross-sectional view of the inlet section of FIG. 6A.
Figure 7A:
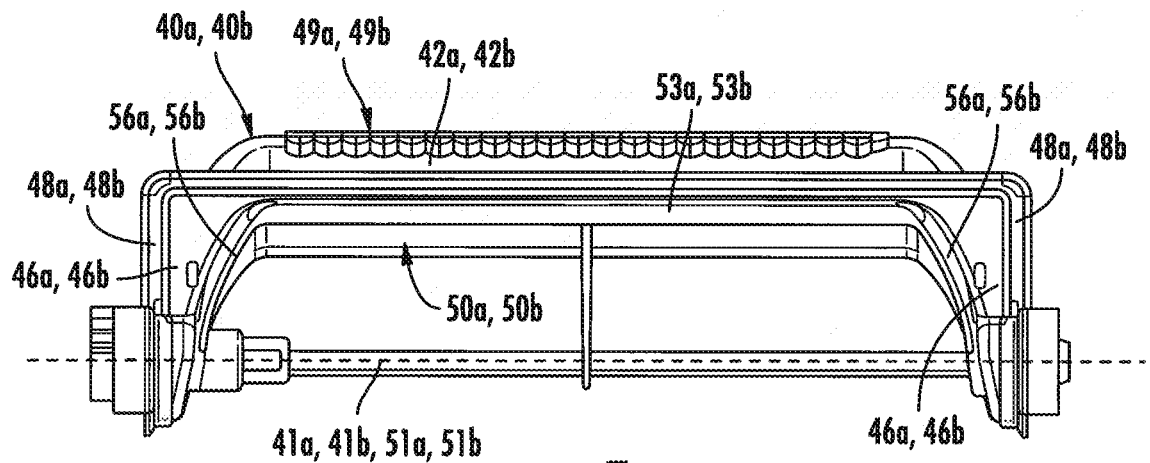
FIG. 7A is a front elevational view of the air distribution doors and the baffle doors according to an embodiment of the presently disclosed subject matter, wherein the doors are shown in isolation from the remainder of the air handling system of FIG. 1.
Figure 8:
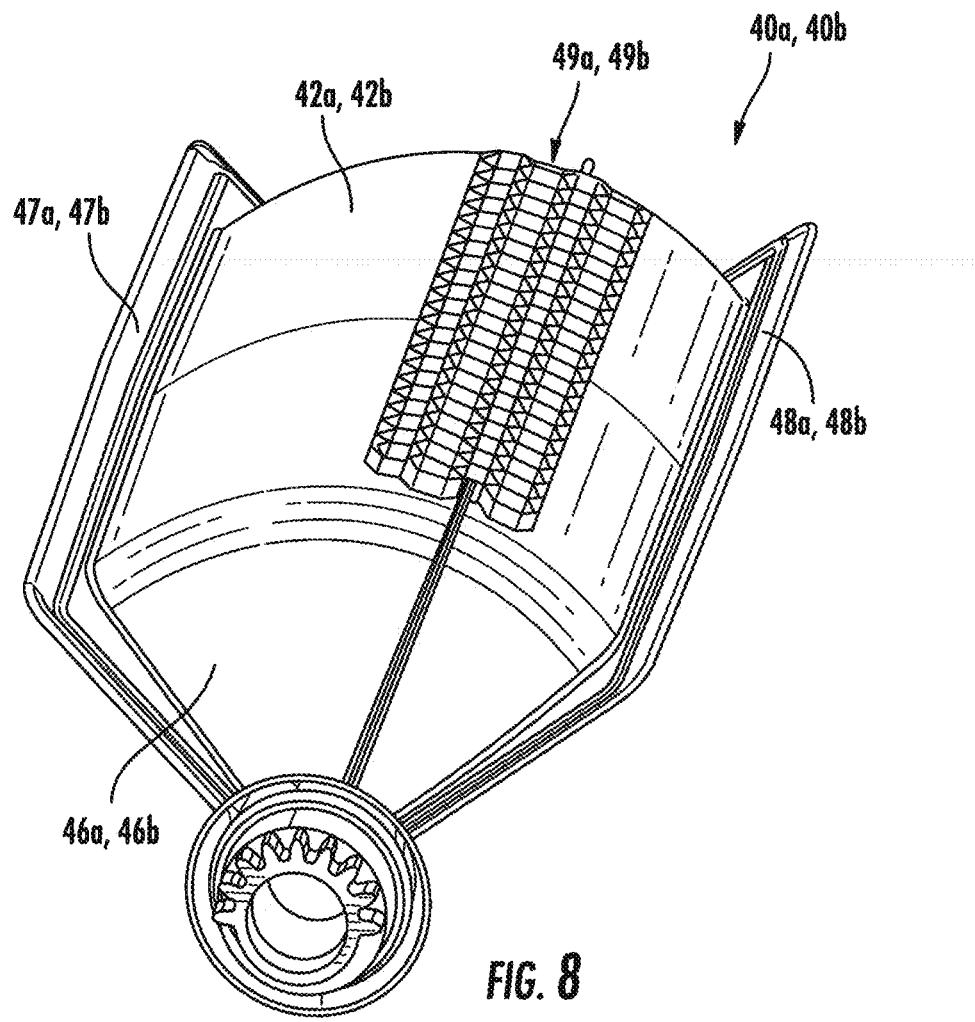
FIG. 8 is a perspective view of the air distribution doors of FIG. 7.
Figure 7B:
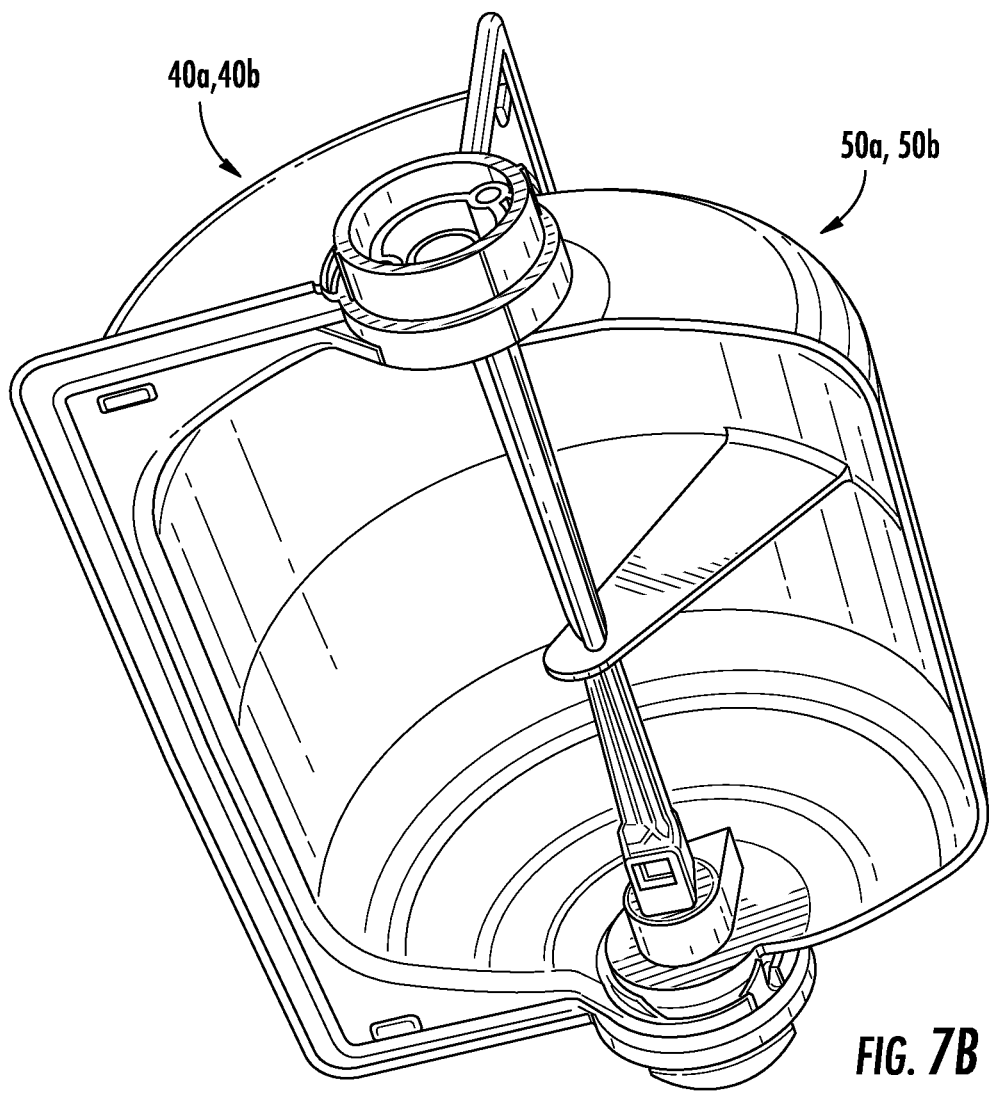
FIG. 7B is a perspective view of the air distribution doors and the baffle doors of FIG. 7A, wherein the doors are rotated at angle relative to one another.

Referring now FIGS. 7A, 7B, and 8, the first air distribution door 40*a* may include an axis of rotation 41*a* defined by a suitable shaft, shaft portions, or similar structures, an air directing wall 42*a*, and a pair of lateral connecting walls 46*a* connecting the air directing wall 42*a* to the structures defining the axis of rotation 41*a* at opposing lateral ends of the air directing wall 42*a*. The first air distribution door 40*a* further may include a first sealing element 47*a* formed around a first peripheral portion of the first air distribution door 40*a* including the lateral connecting walls 46*a* and a first end of the air directing wall 42*a* and a second sealing element 48*a* formed around a second peripheral portion of the first air distribution door 40*a* including the lateral connecting walls 46*a* and a second end of the air directing wall 42*a*. In certain embodiments, the sealing elements 47*a*, 48*a* are configured to engage a corresponding wall portion of the housing 12 in a sealing fashion. As shown, the air directing wall 42*a* may have a substantially constant radius of curvature as measured from the axis of rotation 41*a* of the first air distribution door 40*a*. In certain embodiments, the first air distribution door 40*a* is selectively adjustable between a first position substantially closing the first ambient air inlet 26*a* (depicted in FIGS. 2 and 3G-3J) to militate against a flow of the ambient air therethrough and a second position substantially closing the first recirculation inlet 24*a* (depicted in FIGS. 3A-3F, and 4-6A) to militate against a flow of the recirculation air therethrough. The first air distribution door 40*a* may be further adjustable to a plurality of intermediate positions for regulating the flow of the recirculation air through the first recirculation inlet 24*a* and the flow of the ambient air through the first ambient air inlet 26*a* to optimize performance, effectiveness, and efficiency of the HVAC system 8.

A first baffle door 50*a* may include an axis of rotation 51*a* that coincides with the axis of rotation 41*a* of the first air distribution door 40*a*. The first baffle door 50*a* may include a baffle wall 53*a* that may include a constant radius of curvature as measured from the axis of rotation 51*a* of the first baffle door 50*a*. The baffle wall 53*a* may include a smaller radius of curvature than the first air distribution door 40*a* to form a radial gap between the doors 40*a*, 50*a*, as shown in FIG. 7A. The baffle door 50*a* may further include an opposing pair of lateral connecting walls 56*a* connecting the baffle wall 53*a* to the shaft, shaft portions, or similar shaft structure defining the axis of rotation 51*a* of the baffle door 50*a*. The lateral connecting walls 56*a* are tapered laterally inwardly as the lateral connecting walls 56*a* extend away from the axis of rotation 51*a* and towards the baffle wall 53*a* and may further include a slightly arcuate shape. In certain embodiments, the first baffle door 50*a* is selectively adjustable between a first position substantially closing the first ambient air inlet 26*a* (depicted in FIGS. 2 and 3G-3J) to militate against the flow of the ambient air therethrough and a second position substantially closing the first recirculation inlet 24*a* (depicted in FIGS. 3A-3C, 4, and 6A) to militate against the flow of the recirculation air therethrough. The first baffle door 50*a* may be further adjustable to a plurality of intermediate positions (depicted in FIGS. 3D-3F, and 5) for regulating the flow of the recirculation air through the first recirculation inlet 24*a* and the flow of the ambient air through the first ambient air inlet 26*a* to optimize performance, effectiveness, and efficiency of the HVAC system 8.

The second air distribution door 40*b* may include an axis of rotation 41*b* defined by a suitable shaft, shaft portions, or similar structures, an air directing wall 42*b*, and a pair of lateral connecting walls 46*b* connecting the air directing wall 42*b* to the structures defining the axis of rotation 41*b* at opposing lateral ends of the air directing wall 42*b*. The second air distribution door 40*b* further may include a first sealing element 47*b* formed around a first peripheral portion of the second air distribution door 40*b* including the lateral connecting walls 46*b* and a first end of the air directing wall 42*b* and a second sealing element 48*b* formed around a second peripheral portion of the second air distribution door 40*b* including the lateral connecting walls 46*b* and a second end of the air directing wall 42*b*. In certain embodiments, the sealing elements 47*b*, 48*b* are configured to engage a corresponding wall portion of the housing 12 in a sealing fashion. As shown, the air directing wall 42*b* may have a substantially constant radius of curvature as measured from the axis of rotation 41*b* of the second air distribution door 40*b*. In certain embodiments, the second air distribution door 40*b* is selectively adjustable between a first position substantially closing the second ambient air inlet 26*b* (depicted in FIGS. 2, 3G-3J, and 6A) to militate against a flow of the ambient air therethrough and a second position substantially closing the second recirculation inlet 24*b* (depicted in FIGS. 3A-3F, 4, and 5) to militate against a flow of the recirculation air therethrough. The second air distribution door 40*b* may be further adjustable to a plurality of intermediate positions for regulating the flow of the recirculation air through the second recirculation inlet 24*b* and the flow of the ambient air through the second ambient air inlet 26*b* to optimize performance, effectiveness, and efficiency of the HVAC system 8.

The second baffle door 50*b* may include an axis of rotation 51*b* that coincides with the axis of rotation 41*b* of the second air distribution door 40*b*. The second baffle door 50*b* may include a baffle wall 53*b* that may include a constant radius of curvature as measured from the axis of rotation 51*b* of the second baffle door 50*b*. The baffle wall 53*b* may include a smaller radius of curvature than the second air distribution door 40*b* to form a radial gap between the doors 40*b*, 50*b*, as shown in FIG. 7A. The baffle door 50*b* may further include an opposing pair of lateral connecting walls 56*b* connecting the baffle wall 53*b* to the shaft, shaft portions, or similar shaft structure defining the axis of rotation 51*b* of the baffle door 50*b*. The lateral connecting walls 56*b* are tapered laterally inwardly as the lateral connecting walls 56*b* extend away from the axis of rotation 51*b* and towards the baffle wall 53*b* and may further include a slightly arcuate shape. In certain embodiments, the second baffle door 50*b* is selectively adjustable between a first position substantially closing the second ambient air inlet 26*b* (depicted in FIGS. 2 and 3G-3J) to militate against a flow of the ambient air therethrough and a second position substantially closing the second recirculation inlet 24*b* (depicted in FIGS. 3A-3C, and 4) to militate against a flow of the recirculation air therethrough. The second baffle door 50*b* may be further adjustable to a plurality of intermediate positions (depicted in FIGS. 3D-3F, 5, and 6A) for regulating the flow of the recirculation air through the second recirculation inlet 24*b* and the flow of the ambient air through the second ambient air inlet 26*b* to optimize performance, effectiveness, and efficiency of the HVAC system 8.

The first and second air distribution doors 40*a*, 40*b* may each be swing/barrel type doors having low sensitivity to leaks and deformation caused by the pressure differentials generated within the inlet section 14. In certain embodiments, the first and second baffle doors 50*a*, 50*b* may not include sealing elements, as best seen in FIGS. 7B and 9C, about peripheral surfaces thereof, hence the baffle doors 50*a*, 50*b* are able to independently move between the first and second positions without interference with the associated air distribution doors 40*a*, 40*b* and regardless of the position thereof.

In some embodiments, each of the baffle doors 50*a*, 50*b*, when in the first and/or second positions thereof, may be configured to sealingly engage the associated air distribution doors 40*a*, 40*b* and a corresponding wall portion of the housing 12 to reduce an incidence of noise, vibration, and harshness (NVH) and/or militate against an undesired leakage or flow of the ambient air and/or the recirculation air around the baffle doors 50*a*, 50*b*. Accordingly, the air handling system 10 may be able to more effectively regulate the flow of the recirculation air and the flow of the ambient air through the inlets 24*a*, 24*b*, 26*a*, 26*b* to further optimize performance, effectiveness, and efficiency of the HVAC system 8. It should be appreciated that the sealing engagement may be achieved using various types of sealing methods such as separately affixed sealing elements, over-molded sealing elements, integrally formed sealing elements and/or regions, and the like, for example.

Figure 9A:
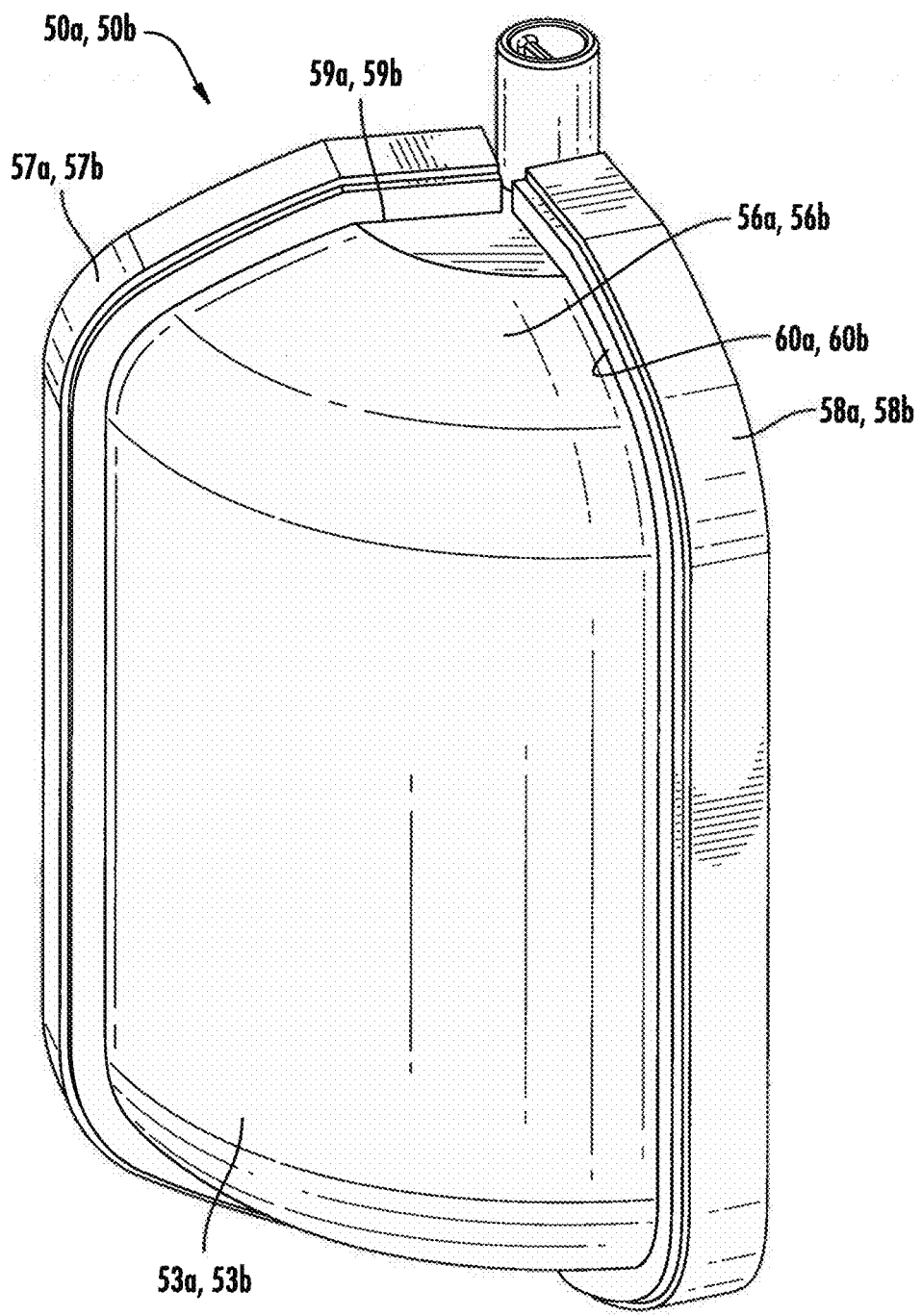
FIG. 9A is a perspective view of the baffle doors according to another embodiment of the presently disclosed subject matter, wherein the doors are shown in isolation from the remainder of the air handling system of FIG. 1 and include a pair of sealing elements.
Figure 9B:
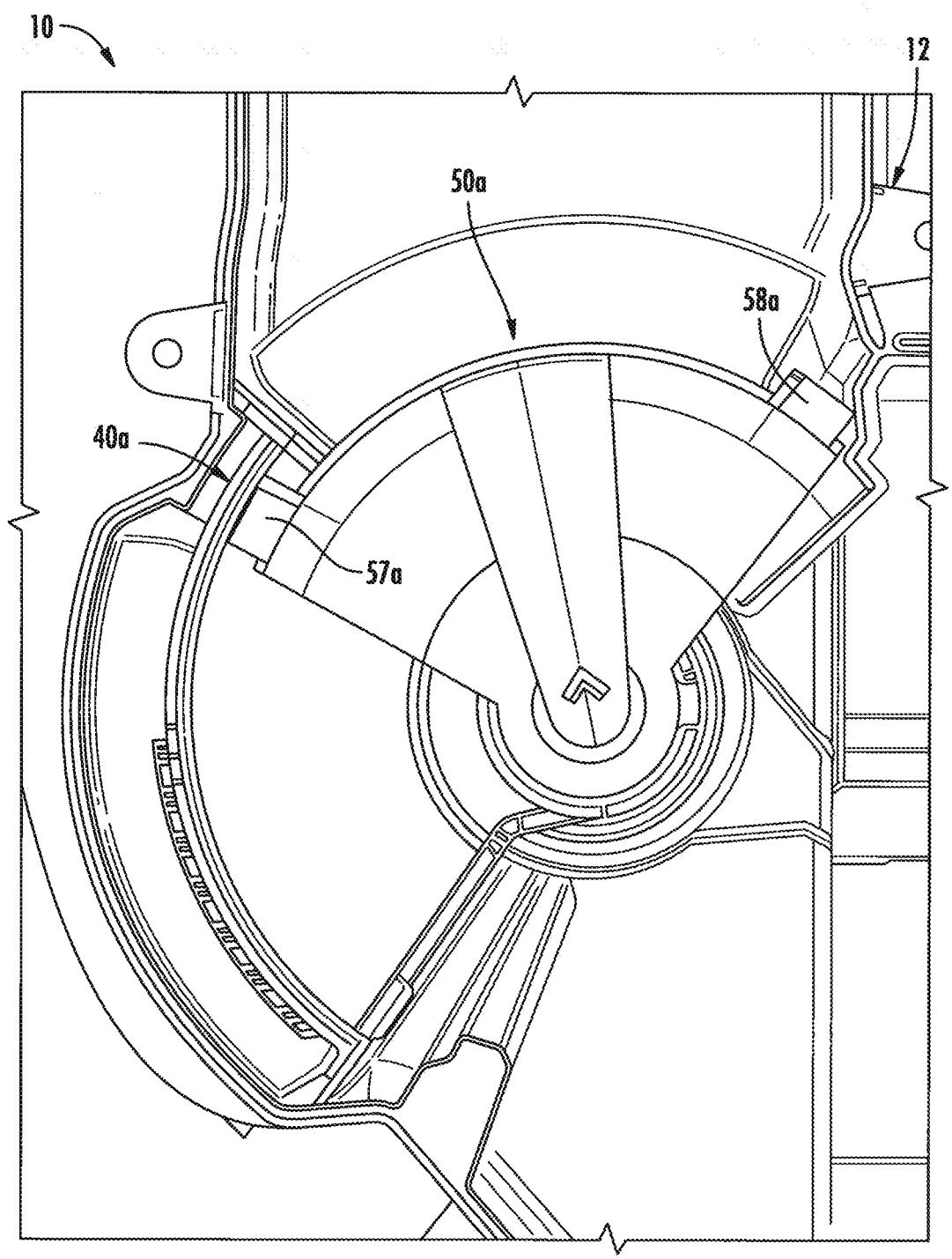
FIG. 9B is an enlarged fragmentary cross-sectional view of a portion of the inlet section of the air handling system of FIG. 1 according to another embodiment of the presently disclosed subject matter, wherein the inlet section includes the baffle doors of FIG. 9A.
Figure 9C:
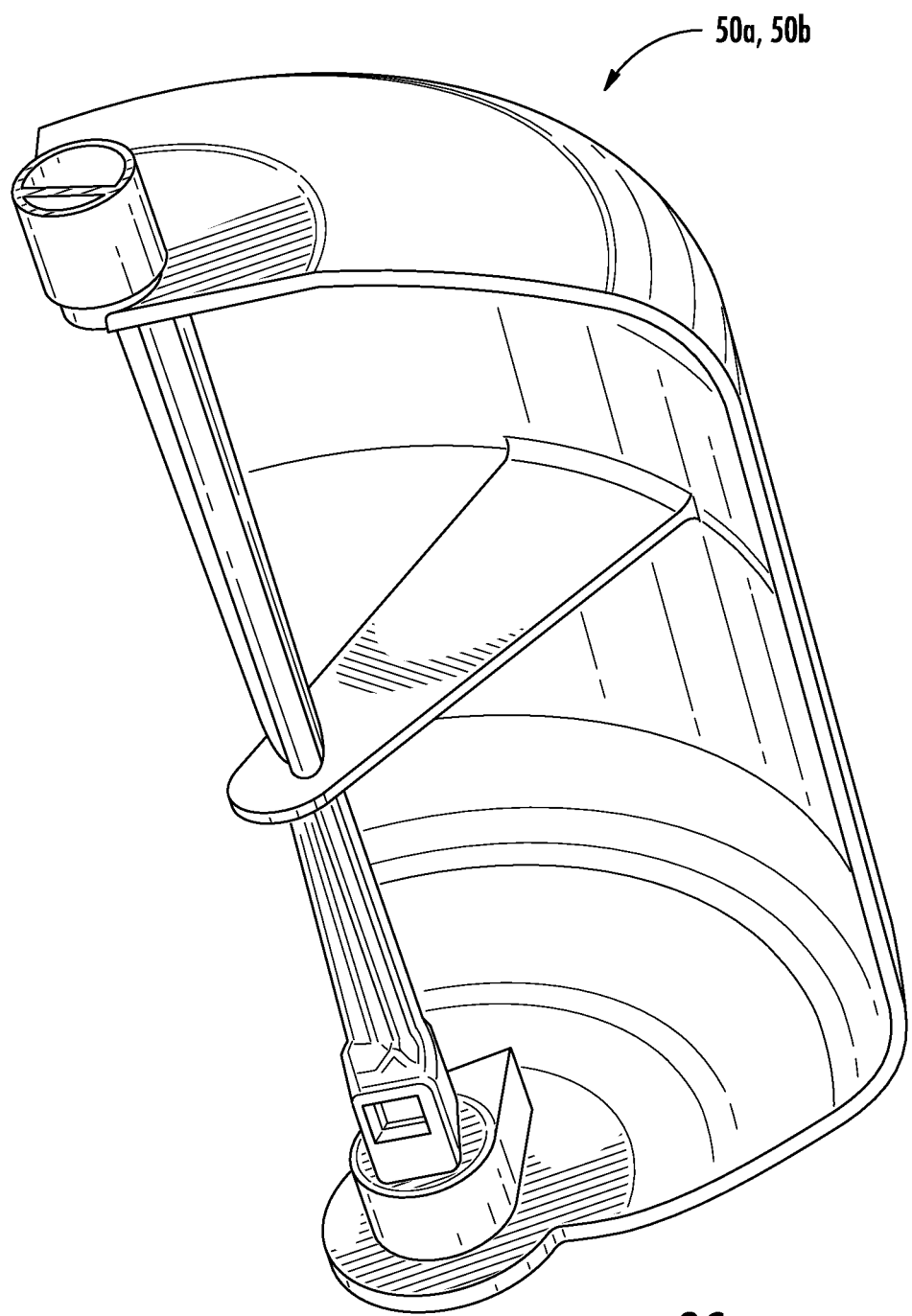
FIG. 9C is a perspective view of the baffle doors according to another embodiment of the presently disclosed subject matter, wherein the doors are shown in isolation from the remainder of the air handling system of FIG. 1 and are devoid of sealing elements.

Turning to the embodiment depicted in FIGS. 9A and 9B, the first baffle door 50*a* may include a first sealing element 57*a* disposed along a first peripheral portion thereof including the lateral connecting walls 56*a* and a first end of the air directing wall 53*a* and a second sealing element 58*a* disposed along a second peripheral portion thereof including the lateral connecting walls 56*a* and a second end of the air directing wall 53*a*. A first guide member 59*a* and a second guide member 60*a* may be formed on the respective first and second peripheral portions of the first baffle door 50*a* to facilitate a proper positioning of the sealing elements 57*a*, 58*a* thereon. As best shown in FIG. 9B, the sealing elements 57*a*, 58*a* may be configured to fit in a gap formed between the first baffle door 50*a* and the first air distribution door 40*a*. Although the sealing elements 57*a*, 58*a* depicted are formed from separate strips of a substantially rigid foam material, it is understood that the sealing elements 57*a*, 58*a* may be formed any suitable material and have any shape, size, and configuration as desired. More or less sealing elements 57*a*, 58*a* than shown may be employed, if desired.

Similarly, the second baffle door 50*a* may also include a first sealing element 57*b* disposed along a first peripheral portion thereof including the lateral connecting walls 56*b* and a first end of the air directing wall 53*b* and a second sealing element 58*b* disposed along a second peripheral portion thereof including the lateral connecting walls 56*b* and a second end of the air directing wall 53*b*. A first guide member 59*b* and a second guide member 60*b* may be formed on the respective first and second peripheral portions of the second baffle door 50*b* to facilitate a proper positioning of the sealing elements 57*b*, 58*b* thereon. The sealing elements 57*b*, 58*b* may be configured to fit in a gap formed between the second baffle door 50*b* and the second air distribution door 40*b*. Although the sealing elements 57*b*, 58*b* depicted are formed from separate strips of a substantially rigid foam material, it is understood that the sealing elements 57*b*, 58*b* may be formed any suitable material and have any shape, size, and configuration as desired. More or less sealing elements 57*b*, 58*b* than shown may be employed, if desired.

Each of the doors 40*a*, 40*b*, 50*a*, 50*b* located within the inlet section 10 may be independently moved and selectively positioned in a plurality of different rotational positions to achieve a plurality of different modes of operation of the air handling system 10. The distribution of air entering the inlet section 10 from the recirculation inlets 24*a*, 24*b* and the ambient air inlets 26*a*, 26*b* may be controlled using each of the air distribution doors 40*a*, 40*b* and/or each of the baffle doors 50*a*, 50*b* based on a mode of operation of the air handling system 10 as selected by a passenger of the vehicle 2, such as a fresh or ambient air mode or a recirculation air mode. In some embodiments, the air handling system 10 may further include a user-selectable partial-recirculation mode, or alternatively the partial-recirculation mode may be automatically selected by the controller 6 associated with the air handling system 10 and responsible for actuating the air distribution doors 40*a*, 40*b* and the baffle doors 50*a*, 50*b* in accordance with various conditions experienced by the vehicle 2, as explained hereinafter.

Referring back to FIG. 2 which illustrates a recirculation mode of operation of the air handling system 10 wherein the first air distribution door 40*a* and a first baffle door 50*a* are in the first positions to militate against the flow of the ambient air through the ambient inlet 26*a* while permitting the flow of the recirculation air through the first recirculation inlet 24*a* of the inlet section 14. The second air distribution door 40*b* and the second baffle door 50*b* are also in the first positions to militate against the flow of the ambient air through the second ambient inlet 26*b* while permitting the flow of the recirculation air through the second recirculation inlet 24*b* of the inlet section 14. The positions of the air distribution doors 40*a*, 40*b* and the baffle doors 50*a*, 50*b* allow for the recirculation air entering through the recirculation inlets 24*a*, 24*b* to flow through the blower flow paths 28*a*, 28*b* and into the blower assembly 29 without substantial inference from the doors 40*a*, 40*b*, 50*a*, 50*b*, thereby preventing an undesired pressure drop in the air passing through the inlet section 10.

FIGS. 3A-3J illustrates a partial ambient air and partial recirculated air mode of operation of the air handling system 10, which may alternatively be referred to as the partial recirculation mode of operation of the air handling system 10. It should be appreciated that FIGS. 3A-3J are illustrative examples, and the doors 40*a*, 40*b*, 50*a*, 50*b* may be selectively positioned in many different configurations and should not construed as limited to the embodiments set forth herein. When the air handling system 10 is operating in the partial recirculation mode, each of the doors 40*a*, 40*b*, 50*a*, 50*b* may be in the first position to militate against the flow of the ambient air through a respective one of the ambient inlets 26*a*, 26*b* while permitting the flow of the recirculation air through the recirculation inlets 24*a*, 24*b* and/or the second position to permit the flow of the ambient air through a respective one of the ambient inlets 26*a*, 26*b* while militating against the flow of the recirculation air through the recirculation inlets 24*a*, 24*b*, and/or a plurality of intermediate positions between the first and second positions to restrict the flow of the recirculation air through a respective one of the recirculation inlets 24*a*, 24*b* and/or the flow of the ambient air through a respective one of the ambient inlets 26*a*, 26*b*.

The alternative intermediate positions of the doors 40*a*, 40*b*, 50*a*, 50*b* may be required to maintain a desired distribution of the air originating from the recirculation inlets 24*a*, 24*b* and the ambient air inlets 26*a*, 26*b*. For example, as the speed of the vehicle 2 increases, a ram air pressure generated within the ambient air inlets 26*a*, 26*b* may increase in a manner causing the ambient air to enter the inlet section 10 at a greater flow rate than the air entering the recirculation inlets 24*a*, 24*b*, thereby interrupting the desired distribution of the air between the inlets 24*a*, 24*b*, 26*a*, 26*b*. The air distribution doors 40*a*, 40*b* may accordingly be rotated a first direction towards or into the first position to reduce a cross-section of the flow of the ambient air passing by the air distribution doors 40*a*, 40*b* originating from the ambient air inlets 26*a*, 26*b* in order to cause a corresponding reduction of the flow of the ambient air into the inlet section 10. In contrast, the air distribution doors 40*a*, 40*b* may be rotated in an opposite second direction towards or into the second position when it may be desired for a greater distribution of the ambient air into the passenger compartment 13, such as when it is determined that the humidity of the air entering or in the passenger compartment 13 is greater than desired. The HVAC system 8 may include at least one humidity sensor (not shown) to detect a humidity level of the air entering or in the passenger compartment 13 of the vehicle. It is understood that the humidity sensor may be any suitable humidity sensor as desired. The humidity sensor may also be in communication with the controller 6 to transmit a signal representative of the humidity level thereto.

The controller 6 associated with operation of the air distribution doors 40*a*, 40*b* and the baffle doors 50*a*, 50*b* may determine the necessary positions thereof based on a known parameter of the vehicle 2 such as a vehicle speed, the humidity level of the air entering or in the passenger compartment 13, a humidity level of the recirculation air entering the recirculation inlets 24*a*, 24*b*, and/or a humidity level of the ambient air entering the ambient inlets 26*a*, 26*b*. The partial recirculation mode of operation of the air handling system 10 may be selected by a passenger of the vehicle 2 or may occur as a feature of the control logic programmed into the controller 6 for regulating the flow of the air from the recirculation inlets 24*a*, 24*b* and the ambient air inlets 26*a*, 26*b* when either of the recirculation mode or a ambient air mode of operation have been selected by the passenger. The automatic positioning of the air distribution doors 40*a*, 40*b* and the baffle doors 50*a*, 50*b* to the partial recirculation mode of operation or to any of the different intermediate positions of the doors 40*a*, 40*b*, 50*a*, 50*b* with respect to the partial recirculation mode of operation may accordingly be determined to account for the varying ram air pressure experienced within the inlet section 10 or for introducing a desired amount of the ambient air into the inlet section 10 for preventing fogging or icing of the windows of the vehicle 2.

Figure 3A:
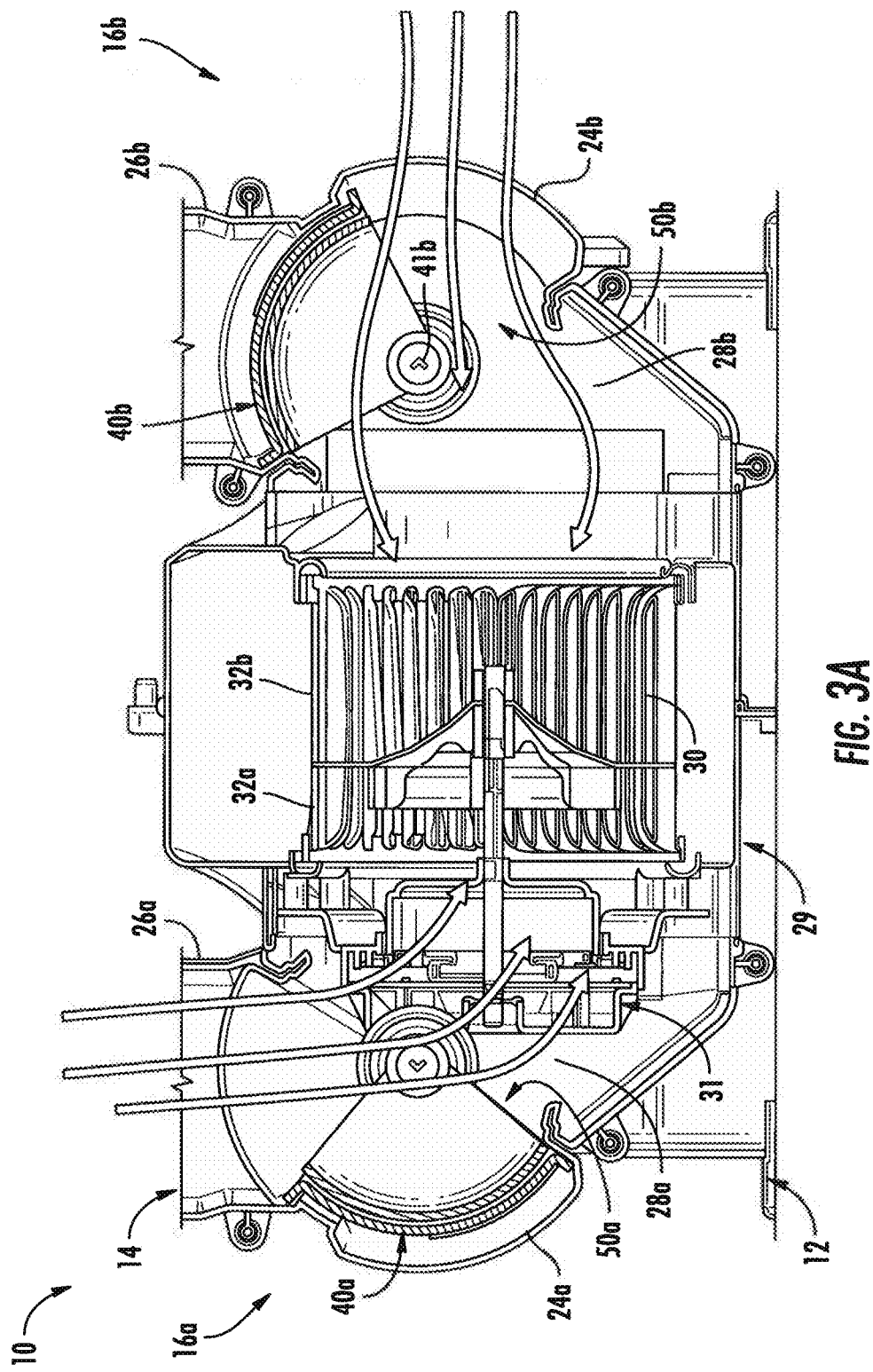
FIG. 3A is a fragmentary cross-sectional elevational view through the inlet section of the air handling system of FIG. 1, wherein the air handling system is operating in a partial recirculation mode of operation with the first air distribution door and the first baffle door in second positions to permit the flow of the ambient air through the first ambient inlet and militate against the flow of the recirculation air through the first recirculation inlet of the inlet section and the second air distribution door and the second baffle door in the first positions to militate against the flow of the ambient air through the second ambient inlet and permit the flow of the recirculation air through the second recirculation inlet of the inlet section.

FIG. 3A shows the air handling system 10 in the partial recirculation mode of operation with the first air distribution door 40*a* and the first baffle door 50*a* in second positions to permit the flow of the ambient air through the first ambient inlet 26*a* and militate against the flow of the recirculation air through the first recirculation inlet 24*a* of the inlet section 10, and the second air distribution door 50*b* and the second baffle door 50*b* in the first positions to militate against the flow of the ambient air through the second ambient inlet 26b and permit the flow of the recirculation air through the second recirculation inlet 24a of the inlet section 10. In some embodiments and as a non-limiting example, the partial recirculation mode of operation of the air handling system 10 shown in FIG. 3A may be employed during an idle state of the vehicle to provide a desired distribution of about 25% ambient air and about 75% recirculation air within the inlet section 10. The partial recirculation mode of operation of the air handling system 10 shown in FIG. 3A may also be employed during a low-speed, low-ram air pressure state of the vehicle 2 to provide a desired distribution of about 75% ambient air and about 25% recirculation air within the inlet section 10.

Figure 3B:
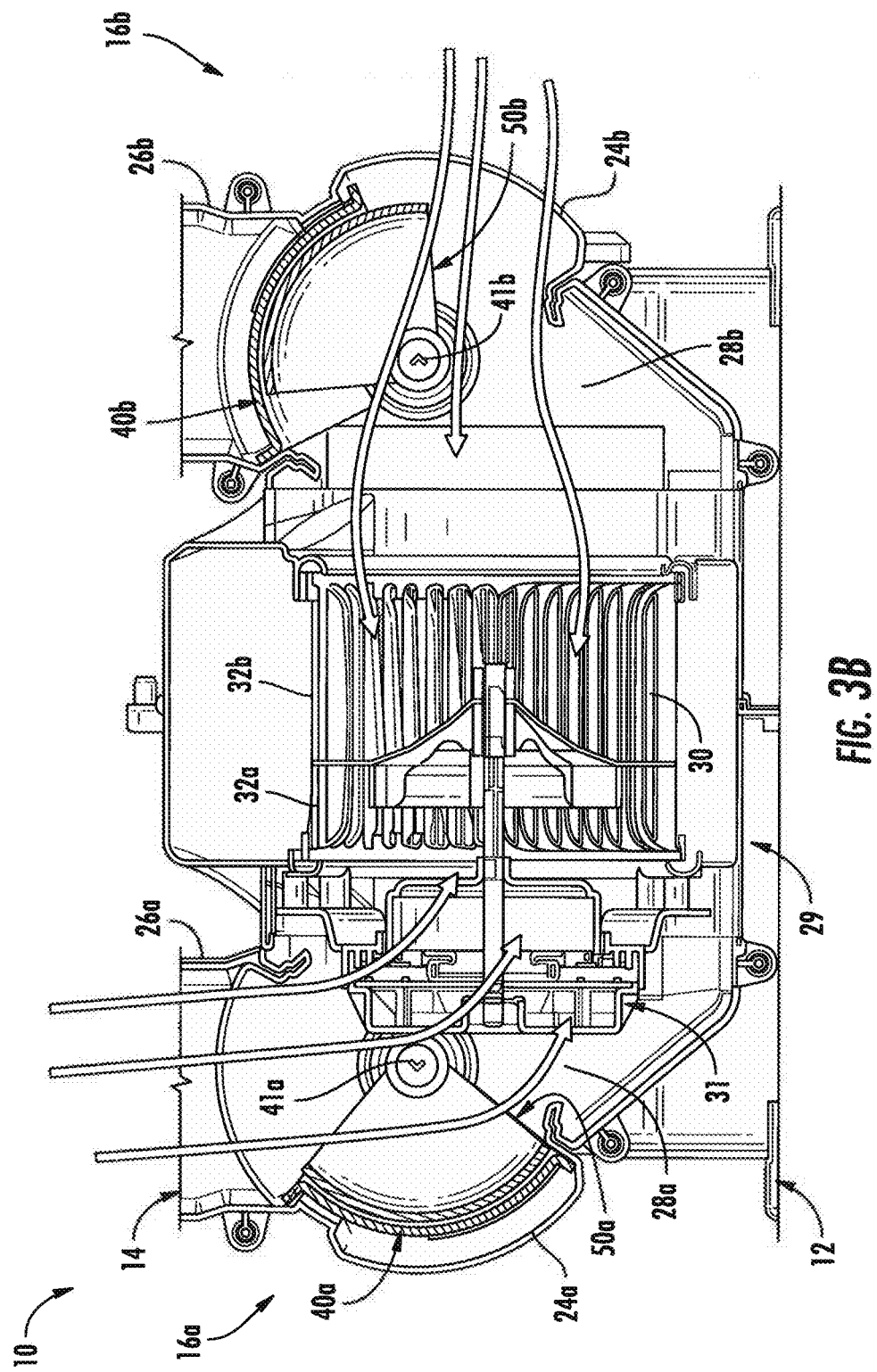
FIG. 3B is a fragmentary cross-sectional elevational view through the inlet section of the air handling system of FIG. 1, wherein the air handling system is operating in a partial recirculation mode of operation with the first air distribution door and the first baffle door in the second positions to permit the flow of the ambient air through the first ambient inlet and militate against the flow of the recirculation air through the first recirculation inlet of the inlet section and the second air distribution door in the first position to militate against the flow of the ambient air through the second ambient inlet and the second baffle door in an intermediate position to permit a constricted flow of the recirculation air through the second recirculation inlet of the inlet section.

FIG. 3B depicts the air handling system 10 in the partial recirculation mode of operation with the first air distribution door 40a and the first baffle door 50a in the second positions to permit the flow of the ambient air through the first ambient inlet 26a and militate against the flow of the recirculation air through the first recirculation inlet 24a of the inlet section 10, and the second air distribution door 40b in the first position to militate against the flow of the ambient air through the second ambient inlet 24b and the second baffle door 50b in an intermediate position towards the second position to permit a constricted flow of the recirculation air through the second recirculation inlet 24b of the inlet section 10. In some embodiments and as a non-limiting example, the partial recirculation mode of operation of the air handling system 10 shown in FIG. 3B may be employed during the idle state of the vehicle 2 to provide a desired distribution of about 50% ambient air and about 50% recirculation air within the inlet section 10.

FIG. 3C shows the air handling system 10 in the partial recirculation mode of operation with the first air distribution door 40a and the first baffle door 50a in the second positions to permit the flow of the ambient air through the first ambient inlet 26a and militate against the flow of the recirculation air through the first recirculation inlet 24a of the inlet section 10, and the second air distribution door 40b in the first position to militate against the flow of the ambient air through the second ambient inlet 26b and the second baffle door 50b in another intermediate position further towards the second position to permit a more constricted flow of the recirculation air through the second recirculation inlet 24b of the inlet section 10 than shown in FIG. 3B. In some embodiments and as a non-limiting example, the partial recirculation mode of operation of the air handling system 10 shown in FIG. 3C may be employed during the idle state of the vehicle 2 to provide a desired distribution of about 75% ambient air and about 25% recirculation air within the inlet section 10.

Figure 3D:
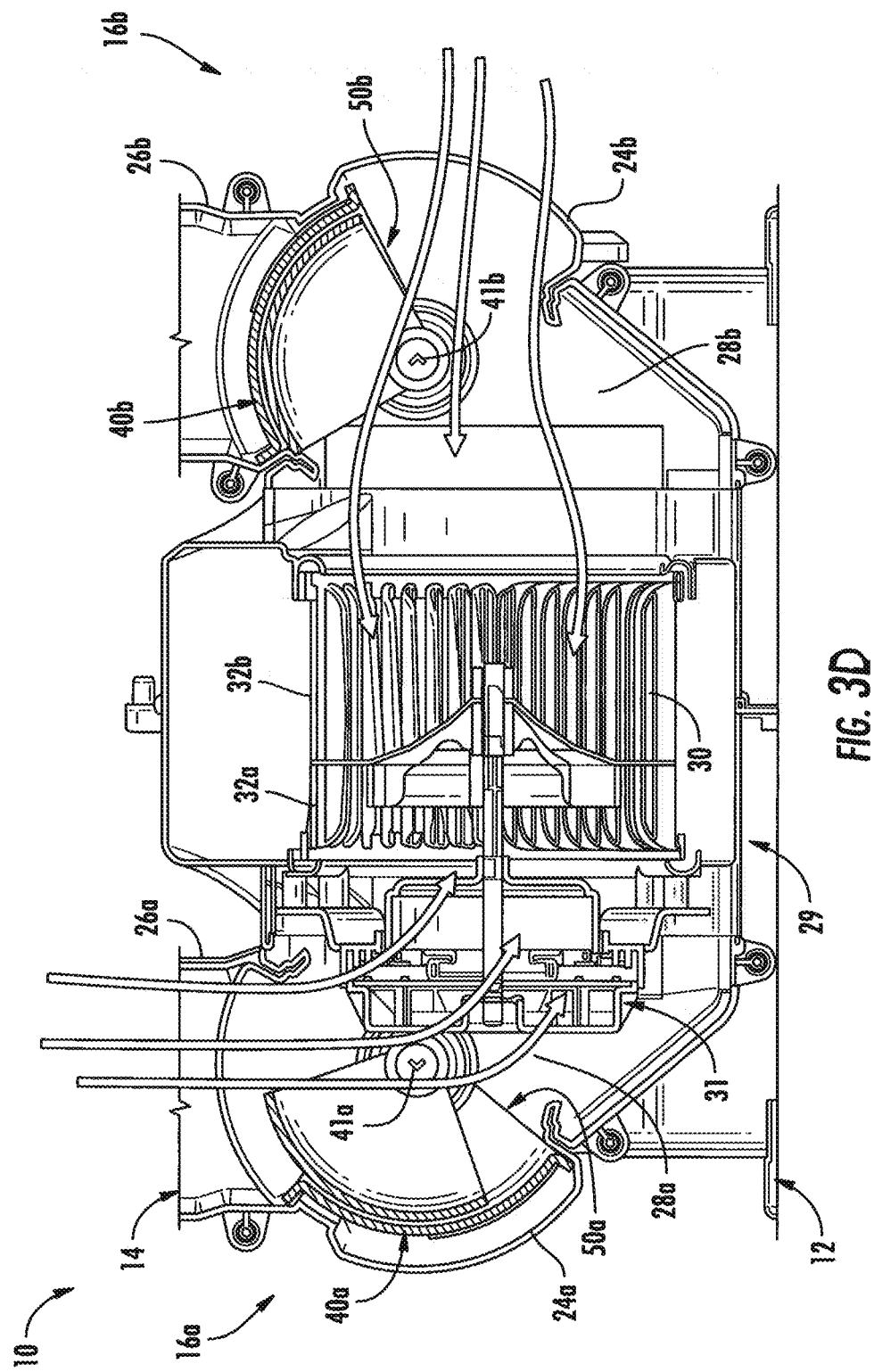
FIG. 3D is a fragmentary cross-sectional elevational view through the inlet section of the air handling system of FIG. 1, wherein the air handling system is operating in a partial recirculation mode of operation with the first air distribution door in the second position to militate against the flow of the recirculation air through the first recirculation inlet and the first baffle door in an intermediate position to permit a constricted flow of the ambient air through the first ambient inlet of the inlet section and the second air distribution door and the second baffle door in the first positions to militate against the flow of the ambient air through the second ambient inlet and permit the flow of the recirculation air through the second recirculation inlet of the inlet section.

FIG. 3D illustrates the air handling system 10 in the partial recirculation mode of operation with the first air distribution door 40a in the second position to militate against the flow of the recirculation air through the first recirculation inlet 24a and the first baffle door 50a in an intermediate position towards the first position to permit a constricted flow of the ambient air through the first ambient inlet 24a of the inlet section 10, and the second air distribution door 40b and the second baffle door 50b in the first positions to militate against the flow of the ambient air through the second ambient inlet 26b and permit the flow of the recirculation air through the second recirculation inlet 24b of the inlet section 10. In some embodiments and as a non-limiting example, the partial recirculation mode of operation of the air handling system 10 shown in FIG. 3D may be employed during a low-speed, low-ram air pressure state of the vehicle 2 to provide a desired distribution of about 50% ambient air and about 50% recirculation air within the inlet section 10. The partial recirculation mode of operation of the air handling system 10 shown in FIG. 3D may also be employed during a high-speed, high-ram air pressure state of the vehicle 2 to provide a desired distribution of about 75% ambient air and about 25% recirculation air within the inlet section 10.

Figure 3E:
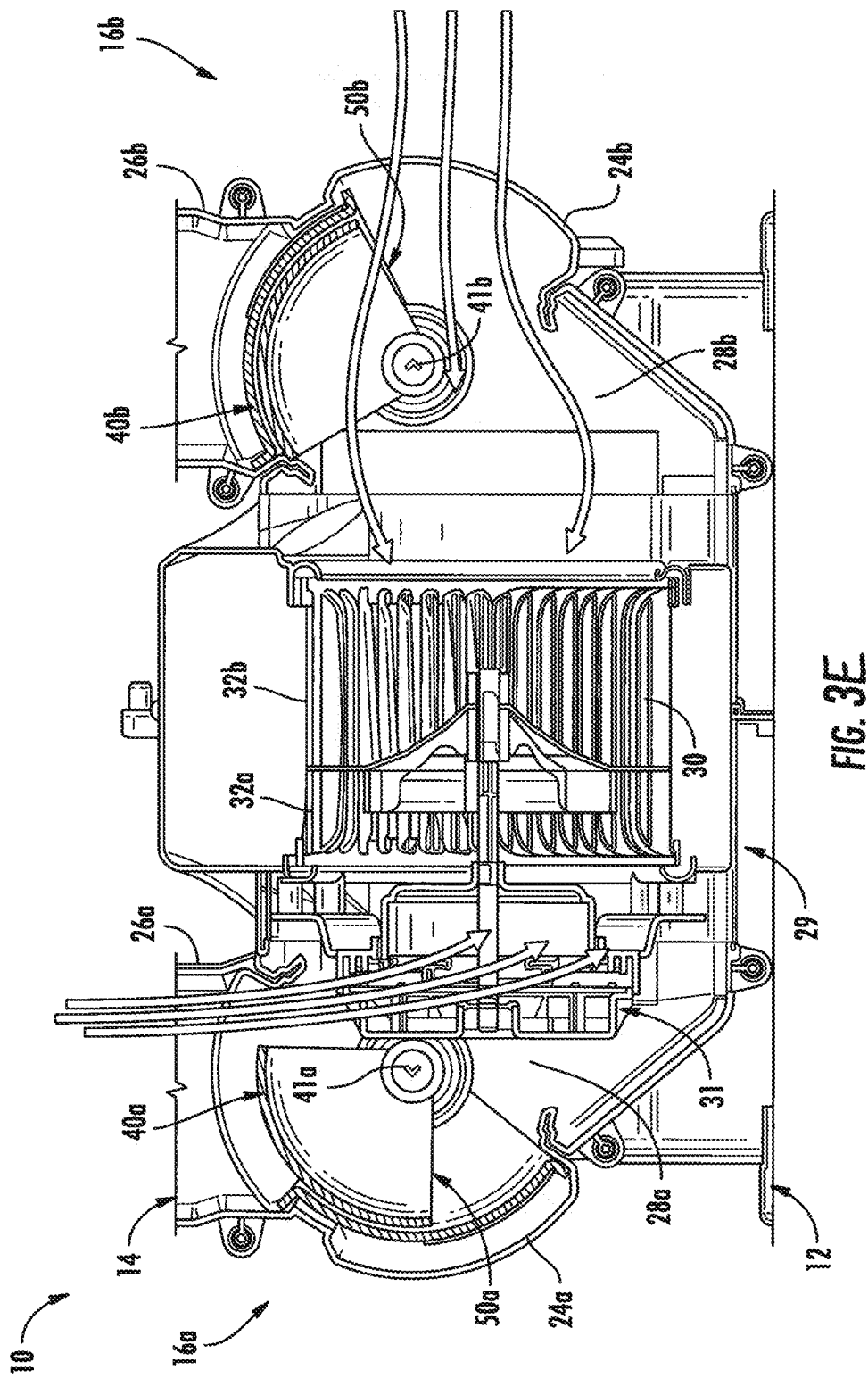
FIG. 3E is a fragmentary cross-sectional elevational view through the inlet section of the air handling system of FIG. 1, wherein the air handling system is operating in a partial recirculation mode of operation with the first air distribution door in the second position to militate against the flow of the recirculation air through the first recirculation inlet and the first baffle door in another intermediate position to permit a more constricted flow of the ambient air through the first ambient inlet of the inlet section than shown in FIG. 3D and the second air distribution door and the second baffle door in the first positions to militate against the flow of the ambient air through the second ambient inlet and permit the flow of the recirculation air through the second recirculation inlet of the inlet section.

FIG. 3E illustrates the air handling system 10 in the partial recirculation mode of operation with the first air distribution door 40a in the second position to militate against the flow of the recirculation air through the first recirculation inlet 24a and the first baffle door 50a in another intermediate position towards the first position to permit a more constricted flow of the ambient air through the first ambient inlet 26a of the inlet section 10 than shown in FIG. 3D, and the second air distribution door 40b and the second baffle door 50b in the first positions to militate against the flow of the ambient air through the second ambient inlet 26b and permit the flow of the recirculation air through the second recirculation inlet 24b of the inlet section 10. In some embodiments and as a non-limiting example, the partial recirculation mode of operation of the air handling system 10 shown in FIG. 3E may be employed during a low-speed, low-ram air pressure state of the vehicle 2 to provide a desired distribution of about 25% ambient air and about 75% recirculation air within the inlet section 10. The partial recirculation mode of operation of the air handling system 10 shown in FIG. 3E may also be employed during a high-speed, high-ram air pressure state of the vehicle 2 to provide a desired distribution of about 50% ambient air and about 50% recirculation air within the inlet section 10.

FIG. 3F illustrates the air handling system 10 in the partial recirculation mode of operation with the first air distribution door 40a in the second position to militate against the flow of the recirculation air through the first recirculation inlet 24a and the first baffle door 50a in yet another intermediate position further towards the first position to permit a more constricted flow of the ambient air through the first ambient inlet 26a of the inlet section than shown in FIGS. 3D and 3E, and the second air distribution door 40b and the second baffle door 50b in the first positions to militate against the flow of the ambient air through the second ambient inlet 26b and permit the flow of the recirculation air through the second recirculation inlet 24b of the inlet section 10. In some embodiments and as a non-limiting example, the partial recirculation mode of operation of the air handling system 10 shown in FIG. 3F may be employed during a high-speed, high-ram air pressure state of the vehicle 2 to provide a desired distribution of about 25% ambient air and about 75% recirculation air within the inlet section 10.

Figure 3G:
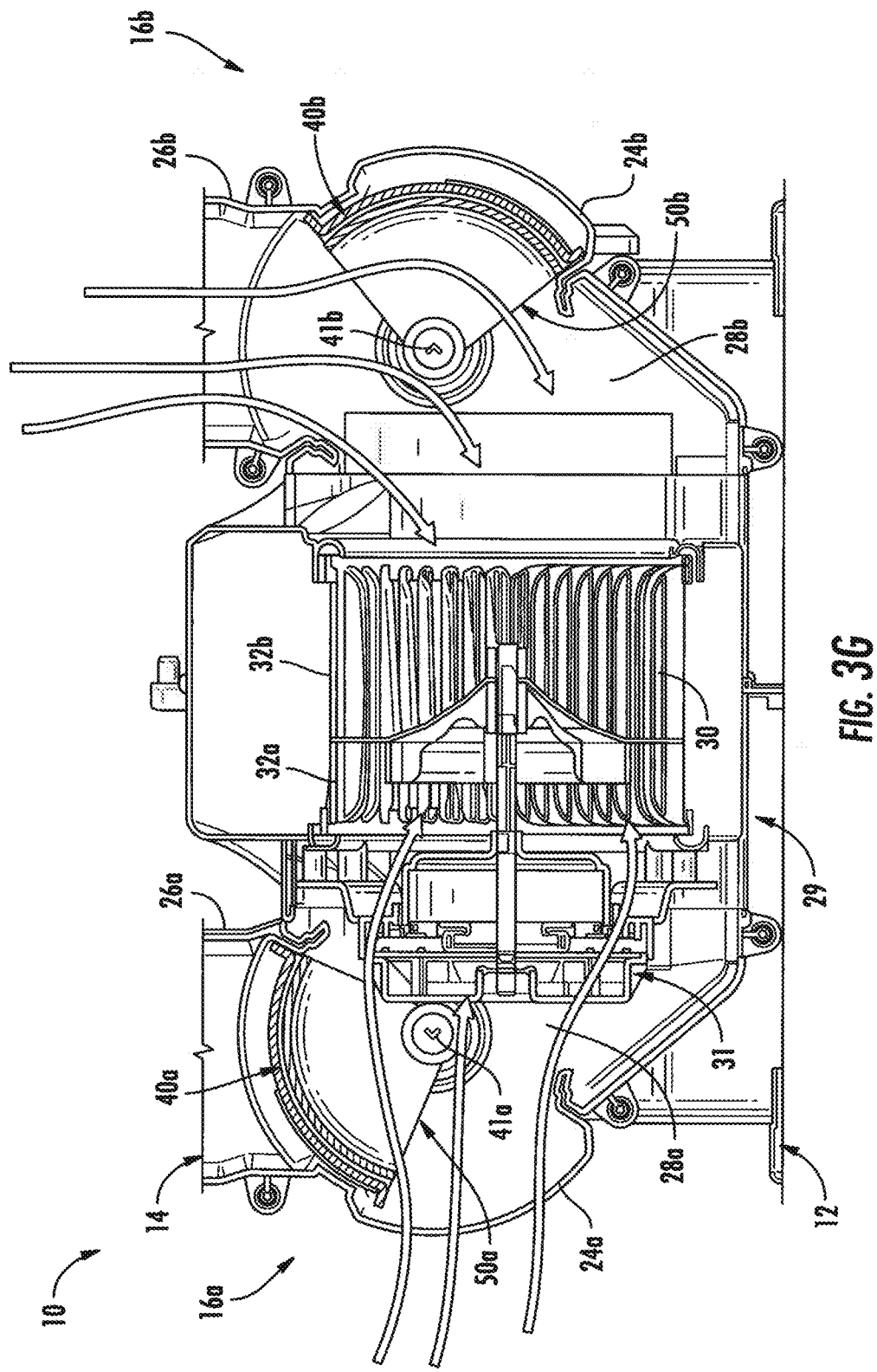
FIG. 3G is a fragmentary cross-sectional elevational view through the inlet section of the air handling system of FIG. 1, wherein the air handling system is operating in a partial recirculation mode of operation with the first air distribution door and the first baffle door in the first positions to militate against the flow of the ambient air through the first ambient inlet and permit the flow of the recirculation air through the first recirculation inlet of the inlet section and the second air distribution door and the second baffle door in the second positions to permit the flow of the ambient air through the second ambient inlet and militate against the flow of the recirculation air through the second recirculation inlet of the inlet section.

FIG. 3G depicts the air handling system 10 in the partial recirculation mode of operation with the first air distribution door 40a and the first baffle door 50a in the first positions to militate against the flow of the ambient air through the first ambient inlet 26a and permit the flow of the recirculation air through the first recirculation inlet 24a of the inlet section 10, and the second air distribution door 40b and the second baffle door 50b in the second positions to permit the flow of the ambient air through the second ambient inlet 26a and militate against the flow of the recirculation air through the second recirculation inlet 24a of the inlet section 10. In some embodiments and as a non-limiting example, the partial recirculation mode of operation of the air handling system 10 shown in FIG. 3G may be employed during the idle state of the vehicle 2 to provide a desired distribution of about 75% ambient air and about 25% recirculation air within the inlet section 10.

Figure 3H:
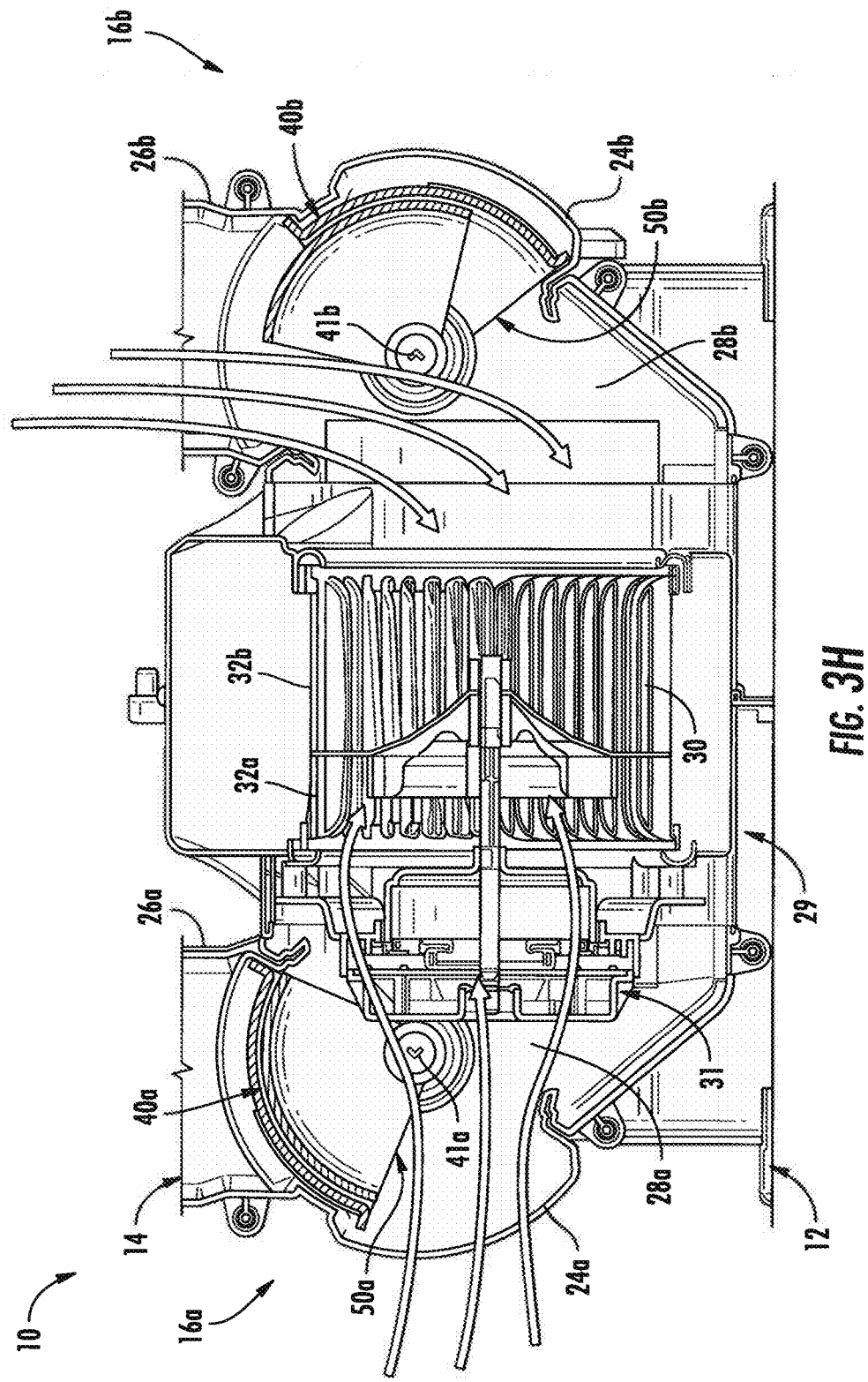
FIG. 3H is a fragmentary cross-sectional elevational view through the inlet section of the air handling system of FIG. 1, wherein the air handling system is operating in a partial recirculation mode of operation with the first air distribution door and the first baffle door in the first positions to militate against the flow of the ambient air through the first ambient inlet and permit the flow of the recirculation air through the first recirculation inlet of the inlet section and the second air distribution door in the second position to militate against the flow of the recirculation air through the second recirculation inlet of the inlet section and the second baffle door in an intermediate position to permit a constricted flow of the ambient air through the second ambient inlet of the inlet section.

FIG. 3H shows the air handling system 10 in the partial recirculation mode of operation with the first air distribution door 40a and the first baffle door 50a in the first positions to militate against the flow of the ambient air through the first ambient inlet 26a and permit the flow of the recirculation air through the first recirculation inlet 24a of the inlet section 10, and the second air distribution door 40b in the second position to militate against the flow of the recirculation air through the second recirculation inlet 24b of the inlet section 10 and the second baffle door 50b in an intermediate position towards the first position to permit a constricted flow of the ambient air through the second ambient inlet 26b of the inlet section 10. In some embodiments and as a non-limiting example, the partial recirculation mode of operation of the air handling system 10 shown in FIG. 3H may be employed during the idle state of the vehicle 2 to provide a desired distribution of about 50% ambient air and about 50% recirculation air within the inlet section 10.

FIG. 3I illustrates the air handling system 10 in the partial recirculation mode of operation with the first air distribution door 40a and the first baffle door 50a in the first positions to militate against the flow of the ambient air through the first ambient inlet 26a and permit the flow of the recirculation air through the first recirculation inlet 24a of the inlet section 10, and the second air distribution door 40b in the second position to militate against the flow of the recirculation air through the second recirculation inlet 24b of the inlet section 10 and the second baffle door 50b in another intermediate position further towards the first position to permit a more constricted flow of the ambient air through the second ambient inlet 26b of the inlet section 10 than shown in FIG. 3H. In some embodiments and as a non-limiting example, the partial recirculation mode of operation of the air handling system 10 shown in FIG. 3I may be employed during a low-speed, low-ram air pressure state of the vehicle 2 to provide a desired distribution of about 50% ambient air and about 50% recirculation air within the inlet section 10.

Figure 3J:
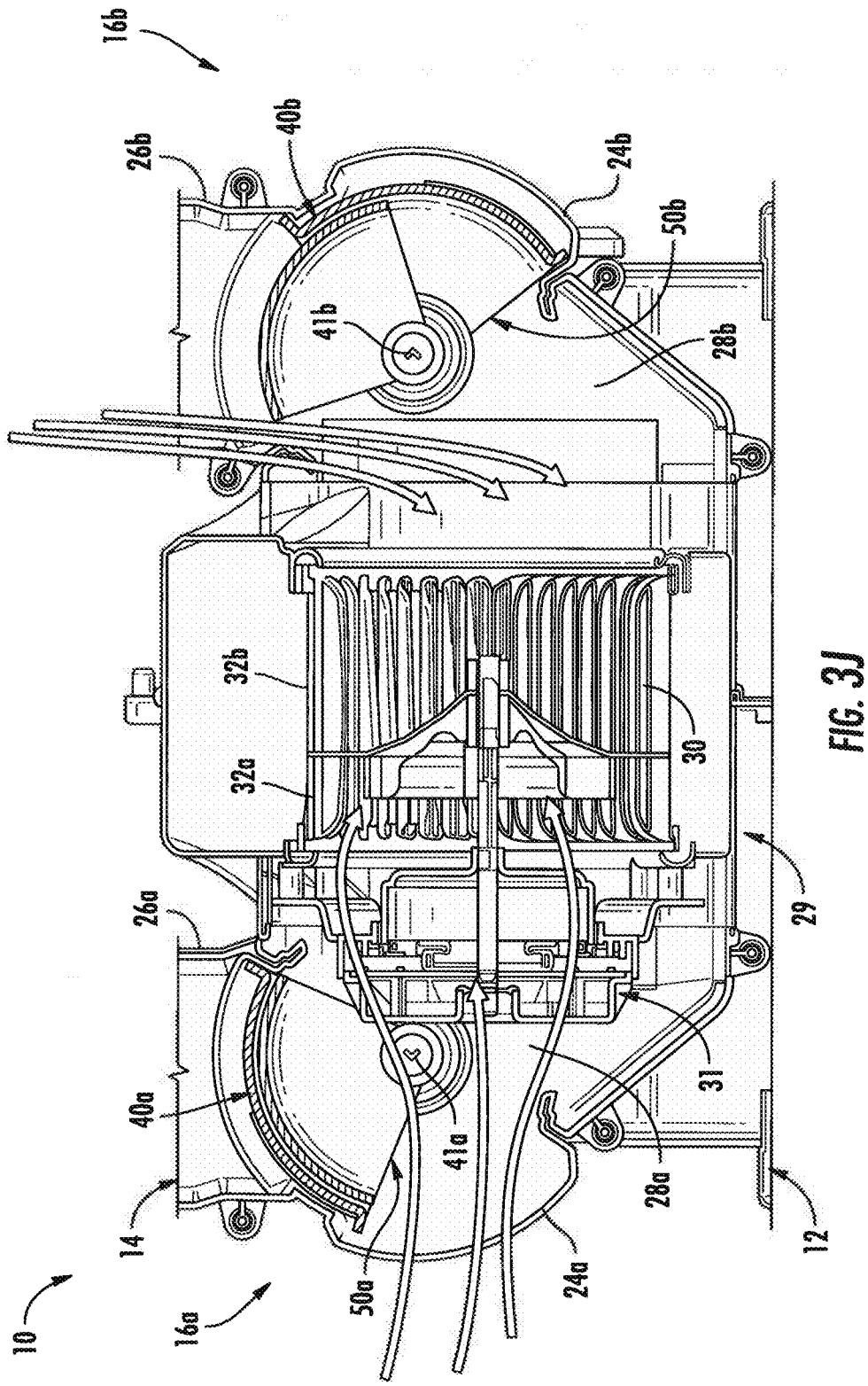
FIG. 3J is a fragmentary cross-sectional elevational view through the inlet section of the air handling system of FIG. 1, wherein the air handling system is operating in a partial recirculation mode of operation with the first air distribution door and the first baffle door in the first positions to militate against the flow of the ambient air through the first ambient inlet and permit the flow of the recirculation air through the first recirculation inlet of the inlet section and the second air distribution door in the second position to militate against the flow of the recirculation air through the second recirculation inlet of the inlet section and the second baffle door in yet another intermediate position to permit a more constricted flow of the ambient air through the second ambient inlet of the inlet section than shown in FIGS. 3H and 3I.

FIG. 3J shows the air handling system 10 in the partial recirculation mode of operation with the first air distribution door 40a and the first baffle door 50a in the first positions to militate against the flow of the ambient air through the first ambient inlet 26a and permit the flow of the recirculation air through the first recirculation inlet 24a of the inlet section 10, and the second air distribution door 40b in the second position to militate against the flow of the recirculation air through the second recirculation inlet 24b of the inlet section 10 and the second baffle door 50b in yet another intermediate position further towards the first position to permit a more constricted flow of the ambient air through the second ambient inlet 26b of the inlet section 10 than shown in FIGS. 3H and 3I. In some embodiments and as a non-limiting example, the partial recirculation mode of operation of the air handling system 10 shown in FIG. 3J may be employed during a high-speed, high-ram air pressure state of the vehicle 2 to provide a desired distribution of about 50% ambient air and about 50% recirculation air within the inlet section 10.

Although not depicted in the figures, it is understood that the air handing system 10 in the partial recirculation mode of operation may also include configurations wherein the first air distribution door 40a is in the first position to militate against the flow of the ambient air through the first ambient inlet 26a of the inlet section 10 and the first baffle door 50a is in one of an intermediate position or the second position to permit a constricted flow or militate against the flow, respectively, of the recirculation air through the first recirculation inlet 24a of the inlet section 10, and the second air distribution door 40b is in the second position to militate against the flow of the recirculation air through the second recirculation inlet 24b of the inlet section 10 and the second baffle door 50b is in one of the first position, the second position, or an intermediate position to militate against the flow, permit an unrestricted flow, or a constricted flow, respectively, of the ambient air through the second ambient inlet 26a of the inlet section 10.

Figure 4:
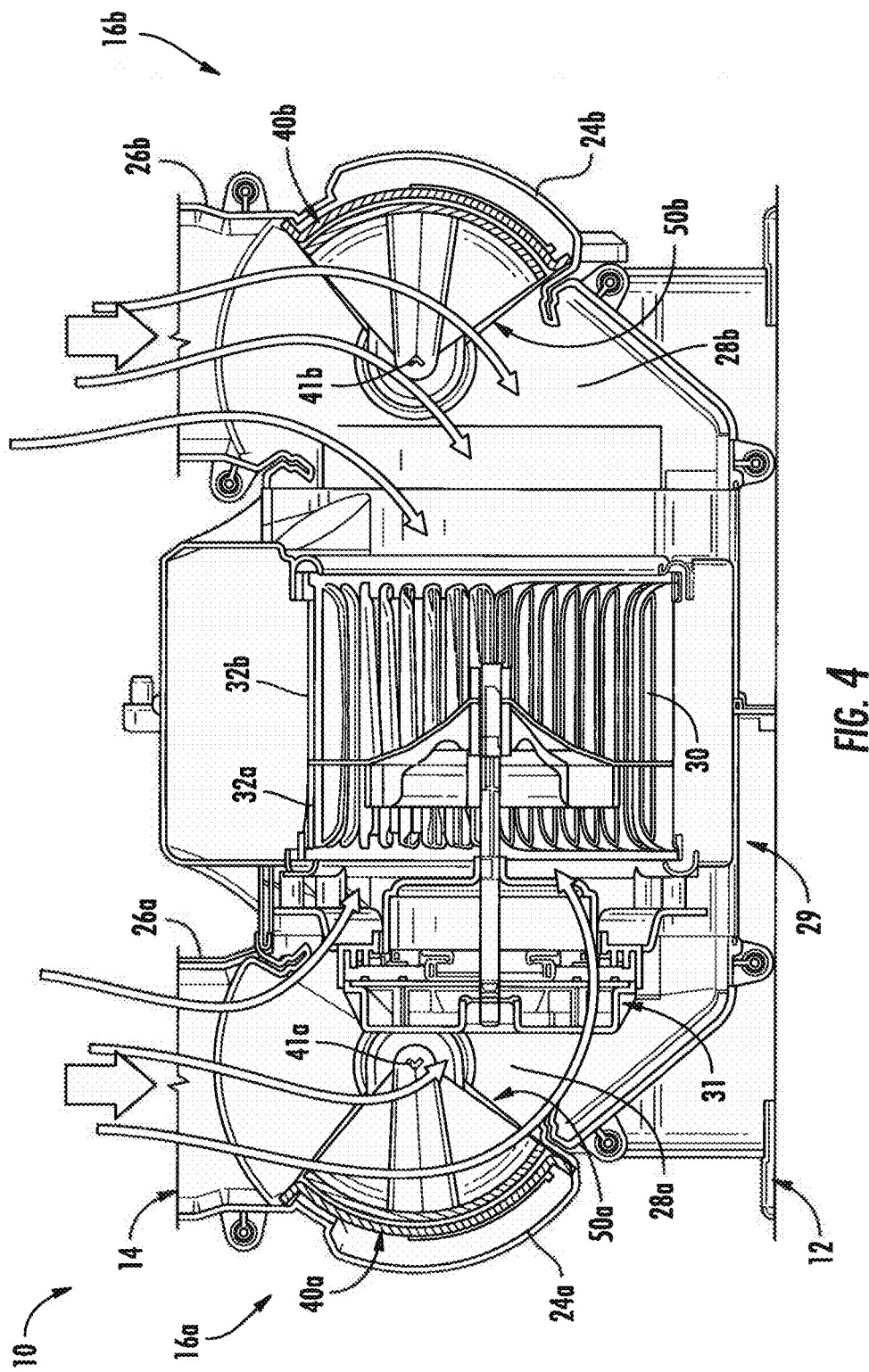
FIG. 4 is a fragmentary cross-sectional elevational view through the inlet section of the air handling system of FIG. 1, wherein the air handling system is operating in a fresh or ambient air mode of operation with the first air distribution door and the first baffle door in the second positions to permit the flow of the ambient air through the first ambient inlet and militate against the flow of the recirculation air through the first recirculation inlet of the inlet section and the second air distribution door and the second baffle door in the second positions to permit the flow of the ambient air through the second ambient inlet and militate against the flow of the recirculation air through the second recirculation inlet of the inlet section.

FIG. 4. Illustrates the inlet section 10 when operated in an ambient air mode of operation of the air handling system 10 with the first air distribution door 40a and the first baffle door 50a in the second positions to permit the flow of the ambient air through the first ambient inlet 26a and militate against the flow of the recirculation air through the first recirculation inlet 24a of the inlet section 10, and the second air distribution door 40b and the second baffle door 50b in the second positions to permit the flow of the ambient air through the second ambient inlet 26b and militate against the flow of the recirculation air through the second recirculation inlet 24b of the inlet section 10. The positions of the doors 40a, 40b, 50a, 50b allows for the ambient air to pass through the inlet section 10 without experiencing an undesired pressure drop.

Figure 5:
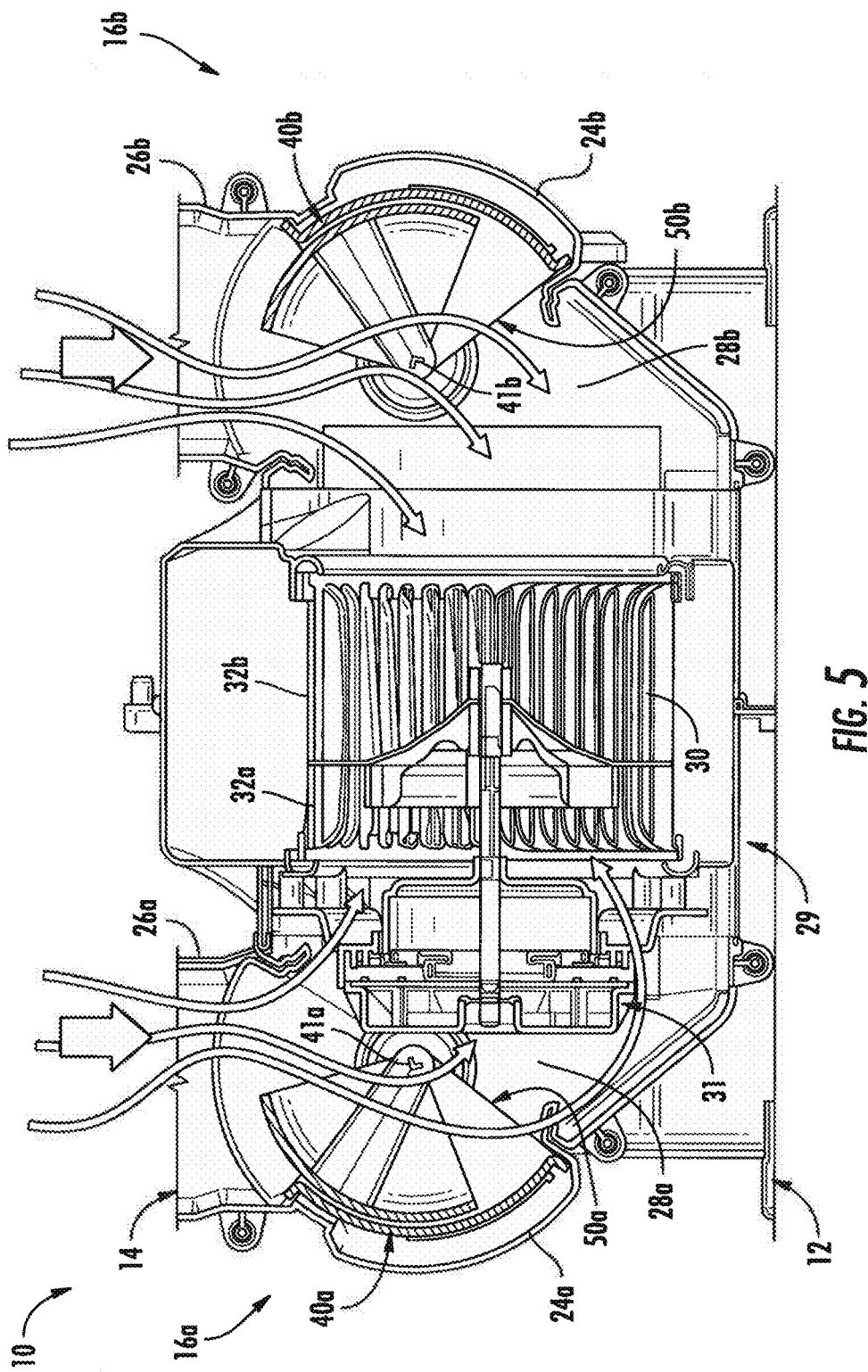
FIG. 5 is a fragmentary cross-sectional elevational view through the inlet section of the air handling system of FIG. 1, wherein the air handling system is operating in the ambient air mode of operation with the first air distribution door in the second position to militate against the flow of the recirculation air through the first recirculation inlet of the inlet section and the first baffle door in an intermediate position to permit a constricted flow of the ambient air through the first ambient inlet of the inlet section and the second air distribution door in the second position to militate against the flow of the recirculation air through the second recirculation inlet of the inlet section and the second baffle door in an intermediate position to permit a constricted flow of the ambient air through the second ambient inlet of the inlet section

FIG. 5 illustrates a mode of operation of the inlet section 10 wherein the ram air pressure generated by motion of the vehicle 2 is accommodated by restricting the flow area through the ambient air inlet 26 when the ambient air mode of operation is selected by the passenger of the vehicle 2. The first air distribution door 40a is in the second position to militate against the flow of the recirculation air through the first recirculation inlet 24a of the inlet section 10 and the first baffle door 50a in an intermediate position towards the first position to permit a constricted flow of the ambient air through the first ambient inlet 26a of the inlet section 10. The second air distribution door 40b is in the second position to militate against the flow of the recirculation air through the second recirculation inlet 24b of the inlet section 10 and the second baffle door 50b is in an intermediate position towards the first position to permit a constricted flow of the ambient air through the second ambient inlet 26b of the inlet section 10. The intermediate positions of the baffle doors 50a, 50b may be varied depending on the speed of the vehicle 2 and hence the resulting ram air pressure of the ambient air entering through the ambient air inlets 26a, 26b, wherein the flow of the ambient air through the ambient air inlets 26a, 26b may be reduced as the ram air pressure increases due to an increase in vehicle speed.

In order to prevent continuous changing of the rotational positions of the doors 40a, 40b, 50a, 50b, the controller 6 associated with the actuation thereof may be pre-programmed to include a finite number of positions of the doors 40a, 40b, 50a, 50b when adjusting for the varying vehicle speeds, ram air pressures, and/or humidity levels, and these finite positions may be actuated towards in reaction to a signal indicating a speed of the vehicle 2 being within one of a finite number of ranges of speed values (for example, 0-25 mph, 25-50 mph, and greater than 50 mph). The prevention of the continuous actuation of the doors 40a, 40b, 50a, 50b may also include the requirement that the speed of the vehicle 2 remain within the desired speed range for a given period of time before readjusting the position of the doors 40a, 40b, 50a, 50b. The controller 6 may be pre-programmed to include data regarding the desired position of the doors 40a, 40b, 50a, 50b relative to the known speed of the vehicle 2 in order to regulate the ram air pressure based on the results of experimentation, as desired.

A degree of constriction of the ambient air inlets 26a, 26b via actuation of the doors 40a, 40b, 50a, 50b has thus far been described as being dependent on the known vehicle speed, ram air pressures, and/or humidity levels, but alternative means may be used to make such a determination. For example, the ambient conditions such as the wind speed encountering the vehicle 2 may render the vehicle speed to be insufficient for properly determining the amount of constriction necessary for establishing a desired dissipation of the ram air pressure generated by motion of the vehicle 2. In such circumstances, it may alternatively be desirable to make a determination of the pressure of the air when entering the ambient air inlet 26 via an appropriate air pressure sensor or the like, wherein the determined air pressure may then be used as feedback to the associated controller 6 for adjusting the positions of the doors 40a, 40b, 50a, 50b for constricting the ambient air inlets 26a, 26b. Alternative means may also be used for determining the adjustment of the doors 40a, 40b, 50a, 50b without necessarily departing from the scope of the present invention, as desired.

The reduction in the flow cross-section through the ambient air inlets 26a, 26b in response to a varying ram air pressure provides for control of the flow rate of the air passing through the remainder of the air handling system 10 during operation of the blower assembly 29. This control of the flow rate of the air prevents situations wherein a passenger of the vehicle 2 continuously is subjected to different air velocities out of the various vents associated with the passenger compartment 13 as a result of factors such as the vehicle speed, thereby maintaining a consistent experience for meeting the comfort demands of the passenger in accordance with the selected mode of operation and air flow rate as chosen by the passenger.

The air distribution doors 40a, 40b and the baffle doors 50a, 50b may be adjusted by a kinematics system having one or more actuators in signal communication with the controller 6 as described hereinabove. It should be appreciated that a wide variety of kinematics systems may be appropriate for adjusting the doors 40a, 40b, 50a, 50b in the manner described hereinabove. However, alternative methods of rotating the doors 40a, 40b, 50a, 50b may be utilized without necessarily departing from the scope of the present invention. For example, each of the doors 40a, 40b, 50a, 50b may be associated with an independent actuator with each of the actuators activated by the corresponding controller 6 independently. Such a configuration advantageously allows for even more operational modes to be achieved without restricting the position of one of the doors 40a, 40b, 50a, 50b relative to the other of the doors 40a, 40b, 50a, 50b. It is also understood that alternative control schemes may be utilized while remaining within the scope of the present invention so long as the doors 40a, 40b, 50a, 50b are able to accommodate the varying vehicle speeds, ram air pressures, humidity levels, or other conditions faced within the inlet section 10 as described hereinabove.

Figure 10:
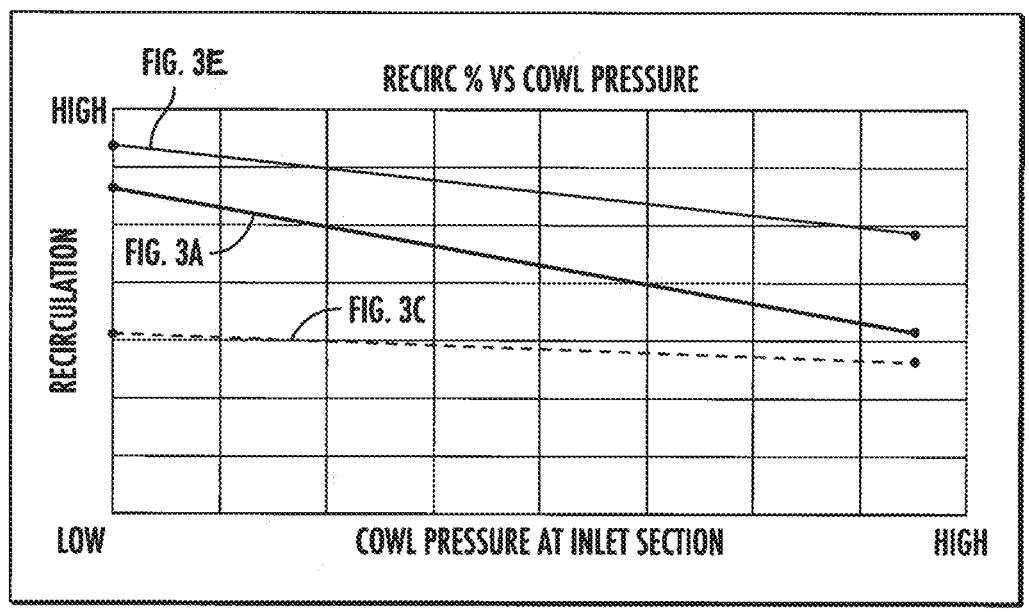
FIG. 10 is a chart showing a relationship between recirculation and cowl pressure at the inlet section of the air handling system of FIG. 1 for the modes of operation illustrated in FIGS. 3A, 3C, and 3E.

FIG. 10 illustrates a chart showing a relationship between recirculation and cowl pressure at the inlet section 14 of the air handling system 10 of FIG. 1 for the modes of operation illustrated in FIGS. 3A, 3C, and 3E.

Figure 11A:
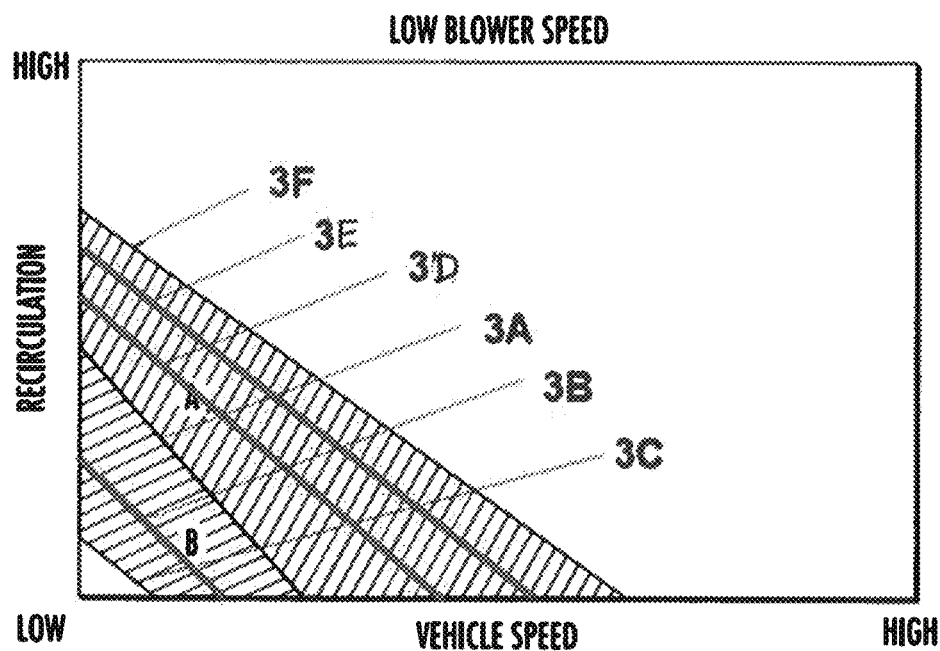
FIG. 11A is a chart showing a relationship between recirculation and vehicle speed at low blower speed of the air handling system of FIG. 1, wherein area A represents an operating envelope of an inlet section including first and second recirculation inlets and first and second fresh or ambient air inlets as demonstrated by a control progression in FIGS. 3A, 3D, 3E, 3F, and area B represents an improvement in the operating envelope provided by the baffle doors configured to selectively restrict a flow of fresh or ambient air through the ambient air inlets and a flow of recirculation air through the recirculation inlets as demonstrated by a control progression in FIGS. 3A, 3B, 3C.

FIG. 11A shows chart indicating a relationship between recirculation and vehicle speed at low blower speed of the air handling system 10 of FIG. 1. Specifically, area A represents an operating envelope of the inlet section 10 including the recirculation inlets 24a, 24b, and the ambient air inlets 26a, 26b as demonstrated by a control progression in FIGS. 3A, 3D, 3E, 3F, and area B represents an improvement in the operating envelope provided by the baffle doors 50a, 50b shown in FIGS. 7A, 7B, and 9C configured to selectively constrict the flow of the recirculation air through the recirculation inlets 24a, 24b and the flow of the ambient air through the ambient air inlets 26a, 26b as demonstrated by a control progression in FIGS. 3A, 3B, 3C.

Figure 11B:
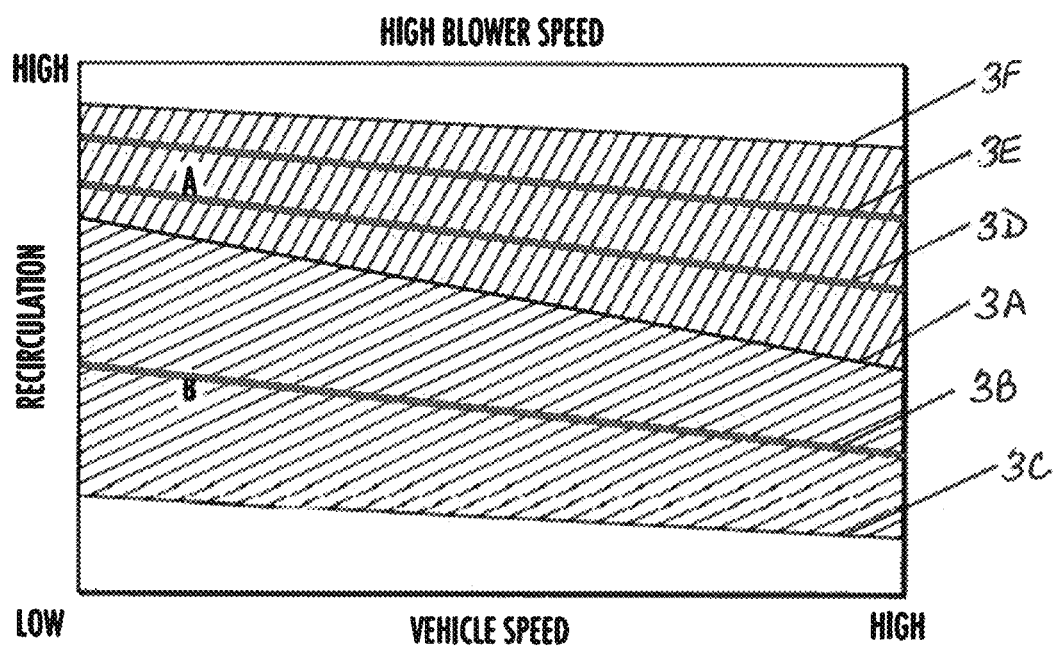
FIG. 11B is a chart showing a relationship between recirculation and vehicle speed at high blower speed of the air handling system of FIG. 1, wherein area A represents an operating envelope of an inlet section including first and second recirculation inlets and first and second fresh or ambient air inlets as demonstrated by a control progression in FIGS. 3A, 3D, 3E, 3F, and area B represents an improvement in the operating envelope provided by the baffle doors configured to selectively restrict a flow of fresh or ambient air through the ambient air inlets and a flow of recirculation air through the recirculation inlets as demonstrated by a control progression in FIGS. 3A, 3B, 3C.

FIG. 11B illustrates a chart indicating a relationship between recirculation and vehicle speed at a high blower speed of the air handling system 10 of FIG. 1, wherein area A represents an operating envelope of the inlet section 10 including the recirculation inlets 24a, 24b, and the ambient air inlets 26a, 26b as demonstrated by a control progression in FIGS. 3A, 3D, 3E, 3F, and area B represents an improvement in the operating envelope provided by the baffle doors 50a, 50b shown in FIGS. 7A, 7B, and 9C configured to selectively constrict the flow of the recirculation air through the recirculation inlets 24a, 24b and the flow of the ambient air through the ambient air inlets 26a, 26b as demonstrated by a control progression in FIGS. 3A, 3B, 3C.

Figure 12A:
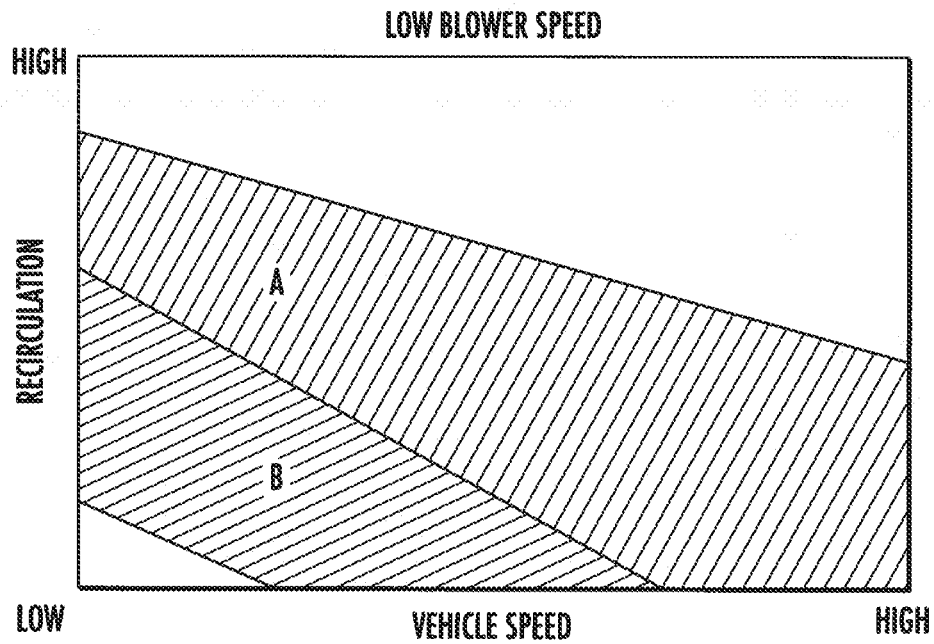
FIG. 12A is a chart showing a relationship between recirculation and vehicle speed at low blower speed of the air handling system of FIG. 1, wherein area A represents an operating envelope of an inlet section including the baffle doors configured to selectively restrict a flow of fresh or ambient air through the ambient air inlets and a flow of recirculation air through the recirculation inlets and area B represents an improvement in the operating envelope provided by the baffle doors of FIGS. 9A and 9B.

FIG. 12A depicts a chart showing a relationship between recirculation and vehicle speed at low blower speed of the air handling system 10 of FIG. 1, wherein area A represents an operating envelope of the inlet section 10 including the baffle doors 50a, 50b shown in FIG. 7 configured to selectively constrict the flow of the recirculation air through the recirculation inlets 24a, 24b and the flow of the ambient air through the ambient air inlets 26a, 26b and area B represents an improvement in the operating envelope provided by the embodiment of the baffle doors 50a, 50b of FIGS. 9A and 9B. More particularly, the area B illustrates the improvement in the operating envelope of the inlet section 10 provided by the baffle doors 50a, 50b that employ sealing elements 57a, 57b, 58a, 58b to reduce NVH and/or militate against the undesired leakage or flow of the ambient air and/or the recirculation air around the baffle doors 50a, 50b to more effectively regulate the flow of the recirculation air and the flow of the ambient air through the inlets 24a, 24b, 26a, 26b.

Figure 12B:
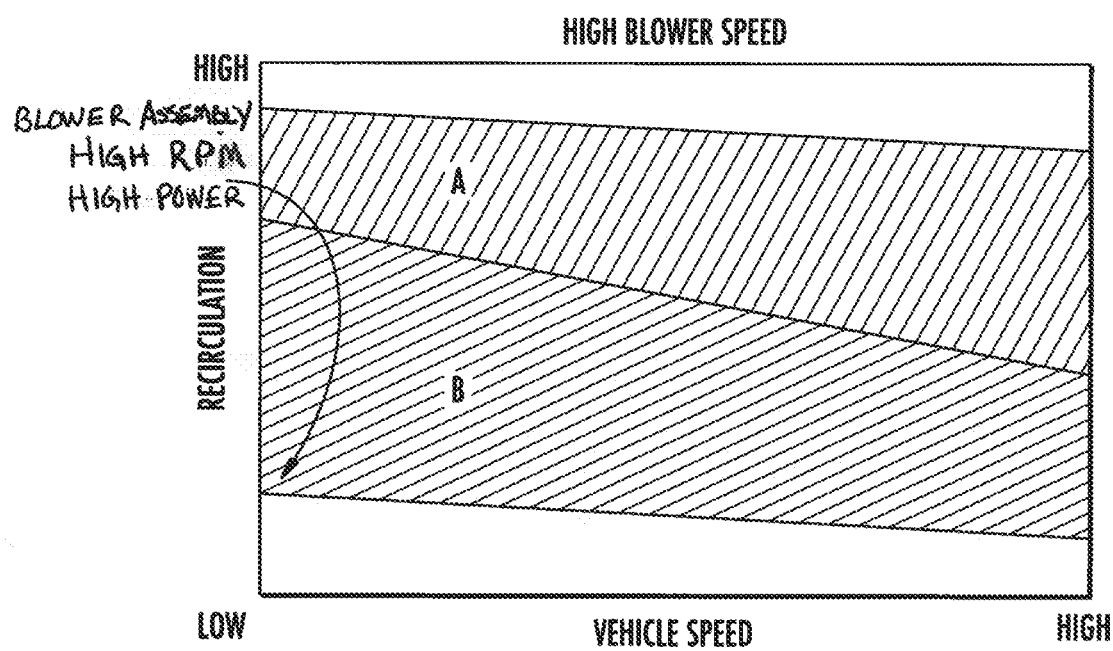
FIG. 12B is a chart showing a relationship between recirculation and vehicle speed at high blower speed of the air handling system of FIG. 1, wherein area A represents an operating envelope of an inlet section including the baffle doors configured to selectively restrict a flow of fresh or ambient air through the ambient air inlets and a flow of recirculation air through the recirculation inlets and area B represents an improvement in the operating envelope provided by the baffle doors of FIGS. 9A and 9B.

FIG. 12B shows a chart illustrating a relationship between recirculation and vehicle speed at high blower speed of the air handling system 10 of FIG. 1. Specifically, area A represents an operating envelope of the inlet section 10 including the baffle doors 50a, 50b of FIG. 7 configured to selectively constrict the flow of the recirculation air through the recirculation inlets 24a, 24b and the flow of the ambient air through the ambient air inlets 26a, 26b and area B represents an improvement in the operating envelope provided by the baffle doors 50a, 50b in accordance with the embodiment shown in FIGS. 9A and 9B. As described for FIG. 12A above, the area B illustrates the improvement in the operating envelope of the inlet section 10 provided by the baffle doors 50a, 50b that employ sealing elements 57a, 57b, 58a, 58b to reduce NVH and/or militate against the undesired leakage or flow of the ambient air and/or the recirculation air around the baffle doors 50a, 50b to more effectively regulate the flow of the recirculation air and the flow of the ambient air through the inlets 24a, 24b, 26a, 26b.

Figure 13A:
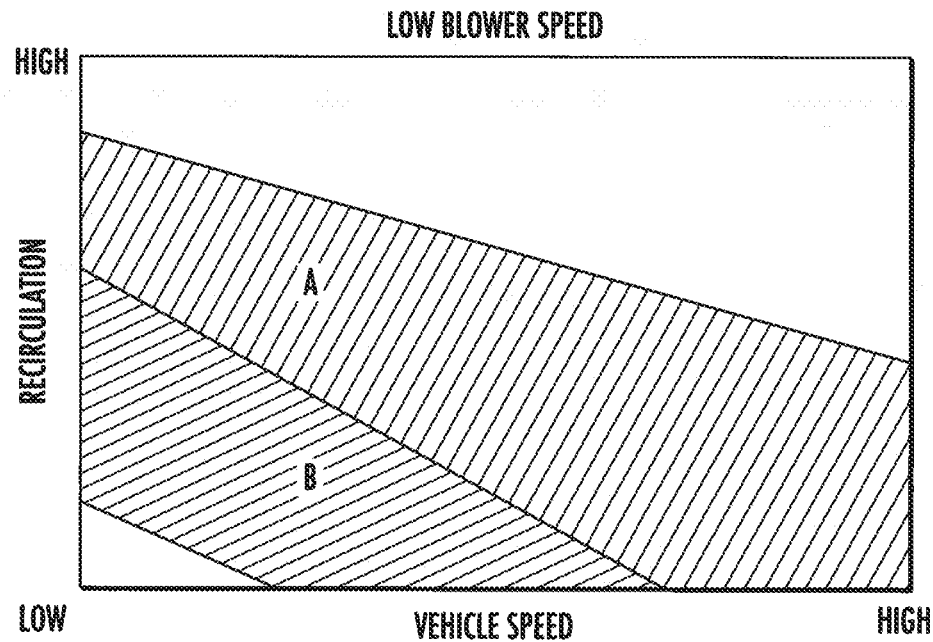
FIG. 13A is a chart showing a relationship between recirculation and vehicle speed at low blower speed of the air handling system of FIG. 1, wherein area A represents an operating envelope of an inlet section including the baffle doors of FIGS. 9A and 9B and area B represents an improvement in the operating envelope provided by a housing of the air handling system configured to allow a crossflow of air between first and second inlet portions of the inlet section.

FIG. 13A depicts a chart showing a relationship between recirculation and vehicle speed at low blower speed of the air handling system 10 of FIG. 1. Area A represents an operating envelope of the inlet section 10 including the baffle doors 50a, 50b of FIGS. 9A and 9B and area B represents an improvement in the operating envelope provided by the housing 12 of the air handling system 10 configured to allow the crossflow of the air flowing through the first blower flow path 28a and the air flowing through the second blower flow path 28b, which thereby allows the air to mix prior to being drawn into the blower assembly 29, as shown in FIG. 6A.

Figure 13B:
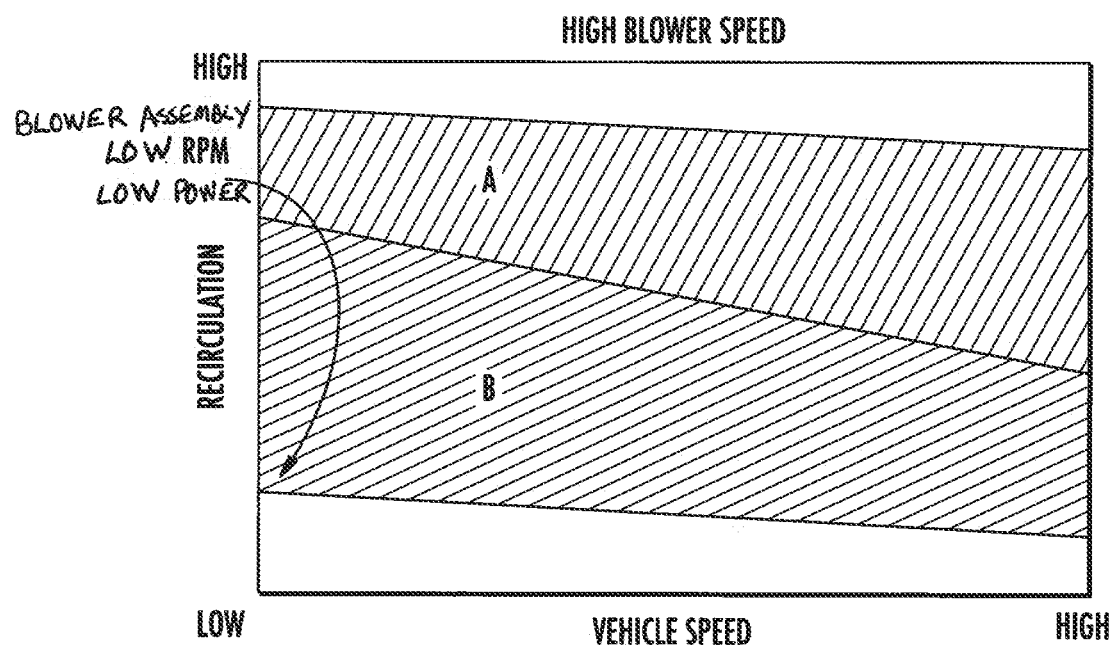
FIG. 13B is a chart showing a relationship between recirculation and vehicle speed at high blower speed of the air handling system of FIG. 1, wherein area A represents an operating envelope of an inlet section including the baffle doors of FIGS. 9A and 9B and area B represents an improvement in the operating envelope and a power consumption of the HVAC system provided by a housing of the air handling system configured to allow a crossflow of air between first and second inlet portions of the inlet section, which results in a reduction in blower speed.

FIG. 13B shows a chart illustrating a relationship between recirculation and vehicle speed at high blower speed of the air handling system 10 of FIG. 1. Specifically, area A represents an operating envelope of the inlet section 10 including the baffle doors 50a, 50b of FIGS. 9A and 9B and area B represents an improvement in the operating envelope and a power consumption of the HVAC system 8 provided by the housing 12 of the air handling system 10 configured to allow the crossflow of the air flowing through the first blower flow path 28a and the air flowing through the second blower flow path 28b, which thereby allows the air to mix prior to being drawn into the blower assembly 29, as shown in FIG. 6A, which requires lower speed and lower power of the blower assembly 29.

Figure 14:
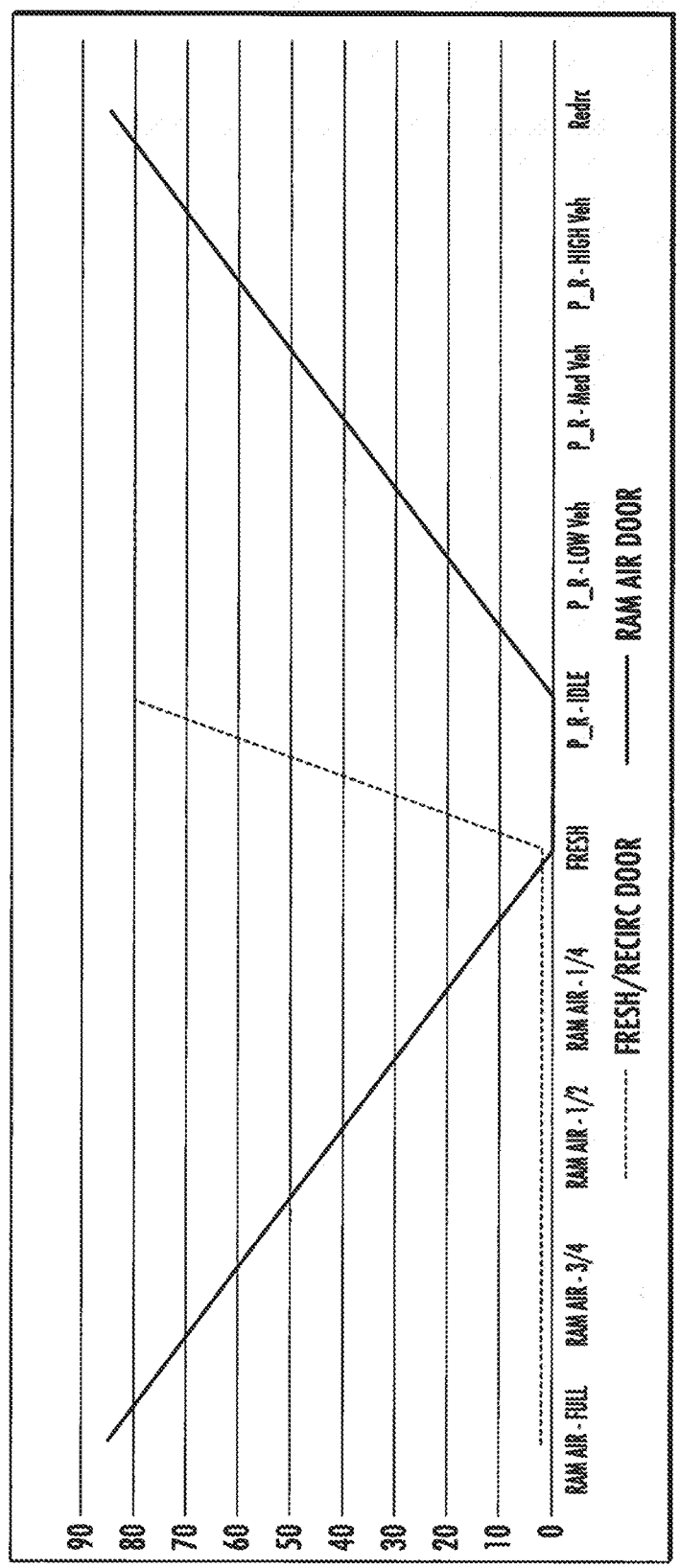
FIG. 14 is a chart showing a kinematic relationship between a position of the air distribution doors and the baffle doors and modes of operation of the air handing system of FIG. 1.

FIG. 14 illustrates a chart for describing the kinematic relationship utilized for simultaneously controlling each of the doors 40a, 40b, 50a, 50b illustrated throughout FIGS. 2-6A. The x-axis of the chart referring to a mode of operation of the air handling system 10 and the y-axis of the chart indicates that each of the associated doors 40a, 40b, 50a, 50b rotates through about 80 to 90 degrees of rotation when adjusted between the end rotational first and second positions thereof used for achieving each of the described modes of operation. Specifically, it is noted in the chart that one end point of the rotation of the doors 40a, 40b, 50a, 50b is associated with the pure recirculation mode of the operation illustrated in FIG. 2 while the opposing end point of the rotation of the doors 40a, 40b, 50a, 50b indicated is associated with the ambient air mode of operation illustrated in FIG. 4. It is further apparent that progressing from the recirculation mode of operation to the ambient air mode of operation and from the ambient air mode of operation to the recirculation mode operation causes the doors 40a, 40b, 50a, 50b to progress in order through the different configurations shown throughout FIGS. 2-5.

As explained previously with regards to the previously disclosed embodiments, the one or more passengers of the vehicle 2 may be allowed to select either the ambient air mode of operation or the recirculation mode of operation for achieving the configurations of the doors 40a, 40b, 50a, 50b disclosed herein. In some circumstances, the one or more passengers may also be allowed to select the partial recirculation mode of operation, as desired. However, upon the selection of a general mode of operation, the controller 6 of the air handling system 10 responsible for actuation of the doors 40a, 40b, 50a, 50b may be configured to monitor aspects of the vehicle 2 such as the vehicle speed, ram air pressures, the humidity levels of the air entering or disposed within the passenger compartment 13 of the vehicle 2, or the actual pressure of the air flowing through any of the flow paths formed by the air handling system 10 in order to selectively position the doors 40a, 40b, 50a, 50b to any of the variable modes of operation.

It should also appreciated that the doors 40a, 40b, 50a, 50b disposed within the inlet section 10 may be configured to be adjusted to positions additional to those shown and described herein for achieving the same distribution of ambient and recirculation air within the inlet section 10 while varying which of the inlets 24a, 24b, 26a, 26b provides the different air flows entering the inlet section 10. These variations may be useful when it is discovered that the NVH or other characteristics of the system are optimized when the air follows specific paths through the housing 12, as determined by experimentation. The different positions may also facilitate increased air flow or better directional control in some circumstances. The different rotational positions needed for achieving these alternative modes may be acquired by adjusting the kinematics used to control the positions of the doors 40a, 40b, 50a, 50b, or may be associated with providing independently controlled actuators or additional kinematics systems as contemplated hereinabove.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system of a vehicle, comprising:
a housing defining an inlet section, the inlet section including a first inlet portion and a second inlet portion, wherein the first inlet portion includes a first recirculation inlet configured to receive recirculated air originating from a passenger compartment of the vehicle and a first ambient air inlet configured to receive ambient air originating from an ambient environment, and wherein the second inlet portion includes a second recirculation inlet configured to receive recirculated air originating from the passenger compartment of the vehicle and a second ambient air inlet configured to receive the ambient air originating from the ambient environment;
a first air distribution door disposed in the inlet section and configured to selectively control a distribution of the recirculated air and the ambient air entering the first inlet portion through the first recirculation inlet and the first ambient air inlet;
a second air distribution door disposed in the inlet section and configured to selectively control a distribution of the recirculated air and the ambient air entering the second inlet portion through the second recirculation inlet and the second ambient air inlet;
a first baffle door disposed in the inlet section and configured to selectively control a flow of the recirculated air and the ambient air entering the first inlet portion through the first recirculation inlet and the first ambient air inlet; and
a second baffle door disposed in the inlet section and configured to selectively control a flow of the recirculated air and the ambient air entering the second inlet portion through the second recirculation inlet and second ambient air inlet, wherein the housing further defines a first blower flow path disposed downstream of the first air distribution door and the first baffle door with respect to the flow of the recirculated air and the flow of the ambient air, wherein the first blower flow path leads to a blower assembly of the air handling system, wherein the housing further defines a second blower flow path disposed downstream of the second air distribution door and the second baffle door with respect to the flow of the recirculated air and the flow of the ambient air, wherein the second blower flow path leads to the blower assembly of the air handling system, and wherein the housing includes one or more openings formed therein to fluidly connect the first blower flow path and the second blower flow path to permit the flow of air from the first inlet portion to mix with the air from the second inlet portion prior to flowing into the blower assembly.

2. The air handling system of claim 1, wherein the first baffle door is configured for sealing against one of a surface of the first air distribution door and a surface of the housing.

3. The air handling system of claim 1, wherein the first air distribution door includes an air directing wall and the first baffle door includes a baffle wall, wherein the baffle wall is disposed radially inwardly of the air directing wall relative to a common axis of rotation.

4. The air handling system of claim 3, wherein the first baffle door includes at least one sealing element disposed along a peripheral portion of the baffle wall for sealing against at least one of a surface of the first air distribution door and a surface of the housing.

5. The air handling system of claim 3, wherein the first baffle door includes at least one sealing element disposed between a radially inner surface of the air directing wall of the first air distribution door and a radially outer surface of the baffle wall of the first baffle door.

6. The air handling system of claim 1, wherein the first air distribution door includes at least one sealing element for sealing against a surface of the housing while the first baffle door is devoid of a sealing element for sealing against a surface of the housing.

7. The air handling system of claim 1, wherein the second baffle door is configured for sealing against one of a surface of the second air distribution door and a surface of the housing.

8. The air handling system of claim 1, wherein the second air distribution door includes an air directing wall and the second baffle door includes a baffle wall, wherein the baffle wall is disposed radially inwardly of the air directing wall relative to a common axis of rotation.

9. The air handling system of claim 8, wherein the second baffle door includes at least one sealing element disposed along a peripheral portion of the baffle wall for sealing against at least one of a surface of the second air distribution door and a surface of the housing.

10. The air handling system of claim 8, wherein the second baffle door includes at least one sealing element disposed between a radially inner surface of the air directing wall of the second air distribution door and a radially outer surface of the baffle wall of the second baffle door.

11. The air handling system of claim 1, wherein the second air distribution door includes at least one sealing element for sealing against a surface of the housing while the second baffle door is devoid of a sealing element for sealing against a surface of the housing.

12. The air handling system of claim 1, wherein the air handling system is configured for operation in a recirculation mode of operation, wherein the recirculation mode of operation includes the first air distribution door and the first baffle door in a first position to militate against a flow of the ambient air through the first ambient air inlet, and the second air distribution door and the second baffle door in a first position to militate against a flow of the ambient air through the second ambient air inlet.

13. The air handling system of claim 1, wherein the air handling system is configured for operation in an ambient air mode of operation, wherein the ambient air mode of operation includes the first air distribution door and the first baffle door in a second position to militate against a flow of the recirculation air through the first recirculation inlet, and the second air distribution door and the second baffle door in a second position to militate against a flow of the recirculation air through the second recirculation inlet.

14. The air handling system of claim 1, wherein at least one of the first baffle door and the second baffle door is configured to decrease the flow of the ambient air through the ambient air inlet to accommodate for an increase of a ram air pressure resulting from an increase in a speed of the vehicle.

15. The air handling system of claim 1, wherein the air handling system is configured for operation in a partial recirculation mode of operation, wherein the partial recirculation mode of operation includes at least one of the first air distribution door, the second distribution door, the first baffle door, and the second baffle door selectively positioned in an intermediate position to selectively control the flow of the recirculated air and/or the ambient air through the inlet section to reach a desired distribution of the recirculated air and the ambient air and accommodate the ram air pressure increasing in response to an increasing speed of the vehicle.

16. A method of operating an air handling system of a vehicle comprising the steps of:

providing a housing, a first air distribution door, a second air distribution door, a first baffle door, and a second baffle door, the housing defining an inlet section, wherein the inlet section includes a first inlet portion and a second inlet portion, wherein the first inlet portion includes a first recirculation inlet configured to receive recirculated air originating from a passenger compartment of the vehicle and a first ambient air inlet configured to receive ambient air originating from an ambient environment, wherein the second inlet portion includes a second recirculation inlet configured to receive recirculated air originating from the passenger compartment of the vehicle and a second ambient air inlet configured to receive the ambient air originating from the ambient environment, wherein the first air distribution door is disposed in the inlet section and configured to selectively control a distribution of the recirculated air and the ambient air entering the first inlet portion through the first recirculation inlet and the first ambient air inlet, wherein the second air distribution door is disposed in the inlet section and configured to selectively control a distribution of the recirculated air and the ambient air entering the second inlet portion through the second recirculation inlet and the second ambient air inlet, wherein the first baffle door is disposed in the inlet section and configured to selectively control a flow of the recirculated air and the ambient air entering the first inlet portion through the first recirculation inlet and the first ambient air inlet, and wherein the second baffle door is disposed in the inlet section and configured to selectively control a flow of the recirculated air and the ambient air entering the second inlet portion through the second recirculation inlet and second ambient air inlet, wherein the housing further defines a first blower flow path disposed downstream of the first air distribution door and the first baffle door with respect to the flow of the recirculated air and the flow of the ambient air, wherein the first blower flow path leads to a blower assembly of the air handling system, wherein the housing further defines a second blower flow path disposed downstream of the second air distribution door and the second baffle door with respect to the flow of the recirculated air and the flow of the ambient air, wherein the second blower flow path leads to the blower assembly of the air handling system, and wherein the housing includes one or more openings formed therein to fluidly connect the first blower flow path and the second blower flow path to permit the flow of air from the first inlet portion to mix with the air from the second inlet portion prior to flowing into the blower assembly; and selectively positioning of at least one of the first air distribution door, the second air distribution door, the first baffle door, and the second baffle door to selectively control a flow of the recirculated air and the ambient air through the inlet section.

17. The method of claim 16, wherein the flow of the ambient air through the inlet section is decreased in response to an increase in a speed of the vehicle.

* * * * *